(12) United States Patent
Uchida

(10) Patent No.: US 8,243,191 B2
(45) Date of Patent: Aug. 14, 2012

(54) IMAGING APPARATUS AND IMAGING CONTROL METHOD FOR FOCUSING BY DETERMINING A FOCUSING POSITION

(75) Inventor: Akihiro Uchida, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 131 days.

(21) Appl. No.: 12/813,985

(22) Filed: Jun. 11, 2010

(65) Prior Publication Data

US 2010/0315514 A1 Dec. 16, 2010

(30) Foreign Application Priority Data

Jun. 15, 2009 (JP) .................................. 2009-142643

(51) Int. Cl.
 *H04N 5/232* (2006.01)
 *G03B 13/36* (2006.01)
(52) U.S. Cl. ...................................................... 348/353
(58) Field of Classification Search .................. 348/345, 348/349, 353, 354, 355, 356
 See application file for complete search history.

(56) References Cited

U.S. PATENT DOCUMENTS

| | | | | |
|---|---|---|---|---|
| 5,144,450 | A | * | 9/1992 | Kikuchi et al. ............... 348/354 |
| 7,596,308 | B2 | * | 9/2009 | Nakai ............................ 348/353 |
| 2004/0061800 | A1 | * | 4/2004 | Yamazaki ..................... 348/349 |
| 2004/0189857 | A1 | * | 9/2004 | Hirai ............................. 348/345 |
| 2010/0123818 | A1 | * | 5/2010 | Ono ............................... 348/345 |

FOREIGN PATENT DOCUMENTS

| | | | | |
|---|---|---|---|---|
| JP | 08321985 | A | * | 12/1996 |
| JP | 3296687 | B2 | | 4/2002 |
| JP | 2006-215391 | A | | 8/2006 |
| JP | 2006215391 | A | * | 8/2006 |
| JP | 2007025559 | A | * | 2/2007 |
| JP | 2007065048 | A | * | 3/2007 |
| JP | 2007286474 | A | * | 11/2007 |
| JP | 2008185823 | A | * | 8/2008 |

* cited by examiner

*Primary Examiner* — Jason Whipkey
(74) *Attorney, Agent, or Firm* — Birch, Stewart, Kolasch & Birch, LLP

(57) ABSTRACT

An imaging apparatus includes: an imaging optical system including a focus lens; an imaging element generates an image indicating an object image; a lens drive device which moves the focus lens along an optical axis direction of the imaging optical system; an evaluation value calculation device which calculates an evaluation value of a contrast for each of a plurality of evaluation value calculation areas while moving the focus lens; a point light source presence/absence determination device which determines a presence or absence of a point light source in a specific region of the image; an area selection device which selects a focusing determination area based on the presence or absence of the point light source; and a focusing control device which determines the focusing position of the focus lens based on the evaluation value in the focusing determination area and moves the focus lens to the focusing position.

16 Claims, 23 Drawing Sheets

FIG.7

IMAGE AREA 200

| 0 | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | 32 | 33 | 34 |
| 35 | 36 | 37 | 38 | 39 | 40 | 41 |
| 42 | 43 | 44 | 45 | 46 | 47 | 48 |

|   |   |   |   |   |   |   |
|---|---|---|---|---|---|---|
| 6 | 13 | 20 | 27 | 34 | 41 | 48 |
| 5 | 12 | 19 | 26 | 33 | 40 | 47 |
| 4 | 11 | 18 | 25 | 32 | 39 | 46 |
| 3 | 10 | 17 | 24 | 31 | 38 | 45 |
| 2 | 9 | 16 | 23 | 30 | 37 | 44 |
| 1 | 8 | 15 | 22 | 29 | 36 | 43 |
| 0 | 7 | 14 | 21 | 28 | 35 | 42 |

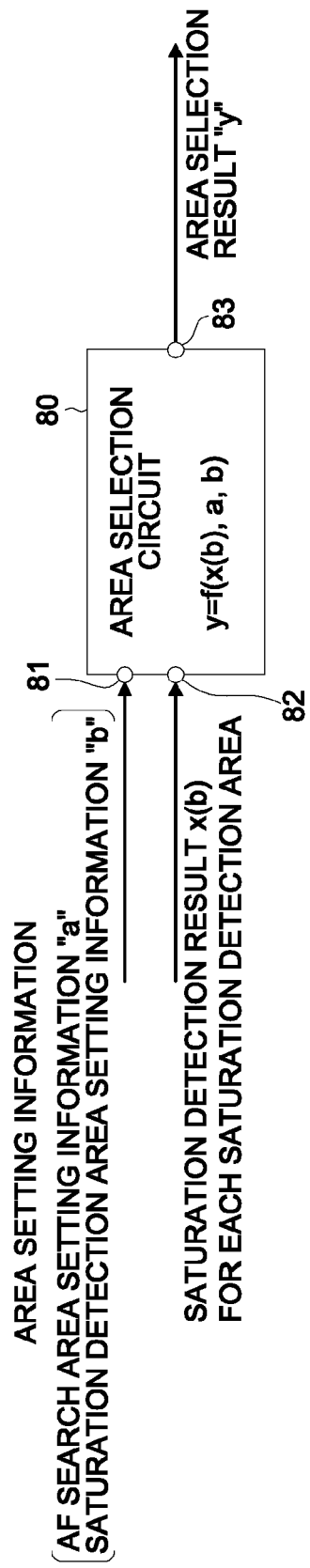

PRIOR ART

PRIOR ART

IMAGING APPARATUS AND IMAGING CONTROL METHOD FOR FOCUSING BY DETERMINING A FOCUSING POSITION

BACKGROUND OF THE INVENTION

1. Field of the Invention

The presently disclosed subject matter relates to an imaging apparatus and an imaging control method capable of focusing by determining a focusing position in an accurate and easy manner even in a scene in which there is a point light source.

2. Description of the Related Art

Japanese Patent No. 3296687 discloses a configuration in which when an AF (automatic focus adjustment process) control is performed, the area of a high-intensity portion is detected in a focusing area; the intensity of the high-intensity portion is weighted in such a manner that the larger the area of the high-intensity portion, the smaller the weight; and the weighted intensity of the high-intensity portion is used as a focus evaluation value.

Japanese Patent Application Laid-Open No. 2006-215391 discloses a configuration in which the pixel area (saturation area) in which the intensity level is saturated in a focusing area is detected and based on the saturation area, switching is performed between an execution of an AF control and no execution of the AF control.

SUMMARY OF THE INVENTION

When a focusing position of a focus lens is determined based on an image contrast, the focusing area for determining the focusing position of the focus lens is required to be small to some extent so as to prevent so-called "rear focusing" (a state that a background which is located at a rear side of a target to be focused is come into focus) from occurring due to an influence of the background. In other words, the focusing is prevented from being made on a position behind a target to be focused. However, if the focusing area is small, it is easier to be influenced by a point light source (a light source the size of which is), thus causing a problem in that the focusing position cannot be determined accurately.

FIGS. 22A-22D are explanatory drawings explaining a focusing position determination in a normal scene using a conventional technique. FIG. 22A illustrates a relationship between a position of a focus lens and a contrast of a focusing area in an image. PORTION A in FIGS. 22B-22D are images which is imaged when the position of the focus lens is at a position P10, P12 and P14, respectively. PORTION B of FIGS. 22B-22D are graphs which illustrate a relationship between a coordinate X in the image (for example, a lateral coordinate of PORTION A) and a level of an image signal.

FIGS. 23A-23D are explanatory drawings explaining a problem with the focusing position determination in a scene with a point light source using a conventional technique. FIG. 23A illustrates a relationship between a position of a focus lens and a contrast of a focusing area in an image. PORTION A in FIGS. 23B-23D are images which is imaged when the position of the focus lens is at a position P20, P22 and P24, respectively. PORTION B of FIGS. 23B-23D are graphs which illustrate a relationship between a coordinate X in the image (for example, a lateral coordinate of PORTION A) and a level of an image signal.

In the case of a normal object, as illustrated in FIG. 22A, when the contrast is calculated in the predetermined focusing area while changing the focus lens position, a mountain-shaped contrast curve is drawn. Thus, a focus lens position (peak position) P12 in which the contrast is local maximum is determined as a focusing position. When the focus lens is moved to the focusing position P12, the focus lens focuses on the object as illustrated in PORTION A in FIG. 22C. However, as illustrated in FIG. 23A, when a point light source portion is present in the focusing area, the image signal of the point light source portion reaches a saturation level. Therefore, a phenomenon occurs that the farther away from the original focusing position P22, the edge is quasi-increased, and thus the image contrast is increased. This causes a problem in that the focusing position is mis-detected and an out of focus occurs.

In order to solve such a problem, it can be considered that if there is a high-intensity portion, the area of a high-intensity portion is detected while moving the focus lens, and the focus lens position in which the area of the high-intensity portion is local minimum is determined as the focusing position. However, generally, this requires an integrating circuit for detecting the area of a high-intensity portion, thus leading to an increase in costs of the apparatus. Unfortunately, the configuration disclosed in Japanese Patent No. 3296687 is also required to detect the area of a high-intensity portion, thus leading to an increase in costs of the apparatus.

Moreover, it can also be considered that if there is a high-intensity portion, the focus lens position in which the object intensity in the focusing area is local minimum is determined as the focusing position. However, it is difficult to find an accurate focusing position by an imaging scene due to an influence such as brightness of the background.

The configuration disclosed in Japanese Patent Application Laid-Open No. 2006-215391 can prevent focusing if there is a point light source but cannot focus accurately if there is a point light source.

In view of the above circumstances, the presently disclosed subject matter has been made, and an object of the presently disclosed subject matter is to provide an imaging apparatus and an imaging control method capable of focusing by determining a focusing position in an accurate and easy manner even in a scene in which there is a point light source.

In order to achieve the object, the presently disclosed subject matter provides an imaging apparatus including: an imaging optical system including a focus lens; an imaging element which images an object image focused by the imaging optical system and generates an image indicating the object image; a lens drive device which moves the focus lens along an optical axis direction of the imaging optical system; an evaluation value calculation device which sets a plurality of evaluation value calculation areas different in size to each other to the image and calculates an evaluation value of a contrast for each of the plurality of evaluation value calculation areas while moving the focus lens by the lens drive device; a point light source presence/absence determination device which determines a presence or absence of a point light source in a specific region of the image; an area selection device which selects a focusing determination area for determining a focusing position of the focus lens from a plurality of the evaluation value calculation areas based on the presence or absence of the point light source; and a focusing control device which determines the focusing position of the focus lens based on the evaluation value in the focusing determination area and moves the focus lens to the focusing position by the lens drive device.

According to the above, based on the presence or absence of a point light source in an image, a focusing determination area is selected from a plurality of evaluation value calculation areas different in size to each other. Therefore, a rate of occurrence of misfocusing can be reduced by reducing an influence exerted on the focusing position determination caused by saturation of pixel values.

In an aspect of the presently disclosed subject matter, the evaluation value calculation device sets a first evaluation value calculation area and a second evaluation value calculation area larger than the first evaluation value calculation area in the image; and if the point light source presence/absence determination device determines that there is no point light source, the area selection device selects the first evaluation value calculation area, and if the point light source presence/absence determination device determines that there is a point light source, the area selection device selects the second evaluation value calculation area.

According to the above, when there is no point light source in the first evaluation value calculation area, the focusing position is determined based on the evaluation value obtained from the first evaluation value calculation area, whereas when there is a point light source in the first evaluation value calculation area, the focusing position is determined based on the evaluation value obtained from the second evaluation value calculation area larger than the first evaluation value calculation area. Therefore, an influence of "rear focusing" can be eliminated by lessening the first evaluation value calculation area as well as a misfocusing ratio can be reduced by reducing an influence exerted on the focusing position determination by a point light source.

In an aspect of the presently disclosed subject matter, the evaluation value calculation device sets a first evaluation value calculation area and a second evaluation value calculation area larger than the first evaluation value calculation area and not overlapped with the first evaluation value calculation area in the image; the point light source presence/absence determination device determines the presence or absence of a point light source in the first evaluation value calculation area; and if the point light source presence/absence determination device determines that there is no point light source in the first evaluation value calculation area, the area selection device selects the first evaluation value calculation area, and if the point light source presence/absence determination device determines that there is a point light source in the first evaluation value calculation area, the area selection device selects the second evaluation value calculation area.

According to the above, when there is a point light source in the first evaluation value calculation area, the focusing position is determined in the second evaluation value calculation area larger than the first evaluation value calculation area and not overlapped with the first evaluation value calculation area. Therefore, the focusing position can be determined by surely excluding the point light source in the first evaluation value calculation area.

In an aspect of the presently disclosed subject matter, the evaluation value calculation device sets a plurality of evaluation value calculation areas not overlapped with each other in the image; the point light source presence/absence determination device determines the presence or absence of the point light source for each of the plurality of evaluation value calculation areas; and the area selection device selects an evaluation value calculation area determined to have no point light source from the plurality of evaluation value calculation areas.

According to the above, the presence or absence of a point light source is determined for each evaluation value calculation area and an evaluation value calculation area determined to have no point light source is selected. Therefore, a rate of occurrence of misfocusing can be remarkably reduced by surely removing an influence exerted on the focusing position determination by a point light source.

In an aspect of the presently disclosed subject matter, the area selection device assigns a priority to each of the plurality of evaluation value calculation areas and selects the evaluation value calculation area in the order of higher priority.

For example, if a determination is made that there is no point light source in the evaluation value calculation area in the center of the image, the area selection device selects the evaluation value calculation area in the center of the image; and if a determination is made that there is a point light source in the evaluation value calculation area in the center of the image, the area selection device selects the evaluation value calculation area set around the evaluation value calculation area in the center of the image based on the priority.

According to the above, the center of the image can be focused first. Therefore, "rear focusing" due to the background can be avoided as well as even if there is a point light source, focusing can be surely made.

In an aspect of the presently disclosed subject matter, the area selection device includes an area selection circuit including: a first port for inputting area setting information indicating a range of a point light source presence/absence determination area for determining a presence or absence of a point light source and a range of the evaluation value calculation area for calculating an evaluation value of the contrast; a second port for inputting a point light source presence/absence determination result in the point light source presence/absence determination area; and a third port for outputting a selection result of the focusing determination area, wherein the area selection circuit outputs a selection result of the focusing determination area based on the area setting information and the point light source presence/absence determination result.

According to the above, the area selection can be made at high speeds by hardware.

For example, the point light source presence/absence determination device determines the presence or absence of a point light source by comparing a pixel value or an intensity value in the image with a threshold value.

For example, the point light source presence/absence determination device calculates an average value of pixel values or intensity values between pixels adjacent to each other in the image and determines the presence or absence of a point light source by comparing the average value in the image with a threshold value.

According to the above, focusing accuracy can be further improved by preventing a misdetection of a point light source due to a damaged pixel.

In an aspect of the presently disclosed subject matter, the evaluation value calculation device calculates the evaluation value at a plurality of lens positions while moving the focus lens in an optical axis direction; and the point light source presence/absence determination device calculates the average value for each of the plurality of lens positions and if a detection is made at the plurality of lens positions that the average value is greater than the threshold, determines that there is a point light source.

According to the above, if detection is made at a plurality of lens positions that an average value of pixel values or intensity values is greater than the threshold, a determination is made that there is a point light source. Therefore, focusing accuracy can be further improved by surely preventing a misdetection of a point light source. Moreover, saturation detection is made at a lens position in which a contrast evaluation value is calculated. Therefore, a point light source can be surely detected at a lens position in which the point light source influences the evaluation value, and thus focusing accuracy can be improved.

Moreover, the presently disclosed subject matter provides an imaging control method using an imaging optical system including a focus lens; an imaging element which images an object image focused by the imaging optical system and generates an image indicating the object image; and a lens drive device which moves the focus lens along an optical axis direction of the imaging optical system, the imaging control method including: an evaluation value calculation step of setting a plurality of evaluation value calculation areas to the image and calculating an evaluation value of a contrast of the image for each of the plurality of evaluation value calculation areas while moving the focus lens by the lens drive device; a point light source presence/absence determination step of determining a presence or absence of a point light source in the image; an area selection step of selecting a focusing determination area for determining a focusing position of the focus lens from a plurality of the evaluation value calculation areas based on the presence or absence of the point light source; and a focusing control step of determining the focusing position of the focus lens based on the evaluation value in the focusing determination area and moving the focus lens to the focusing position by the lens drive device.

The presently disclosed subject matter can focus by determining a focusing position in an accurate and easy manner even in a scene in which there is a point light source.

BRIEF DESCRIPTION OF THE DRAWINGS

FIG. 7 is an explanatory drawing illustrating another example of the AF search area according to the first embodiment;

FIG. 12 is an explanatory drawing illustrating an example of an AF search area according to the second embodiment;

FIG. 13 is an explanatory drawing illustrating an example of a saturation detection area according to a third embodiment;

FIG. 21 is a schematic drawing of an area selection circuit according to the fifth embodiment;

DETAILED DESCRIPTION OF THE PREFERRED EMBODIMENTS

Hereinafter, embodiments of the presently disclosed subject matter will be described in detail by referring to the accompanying drawings.

First Embodiment

Figure 1:
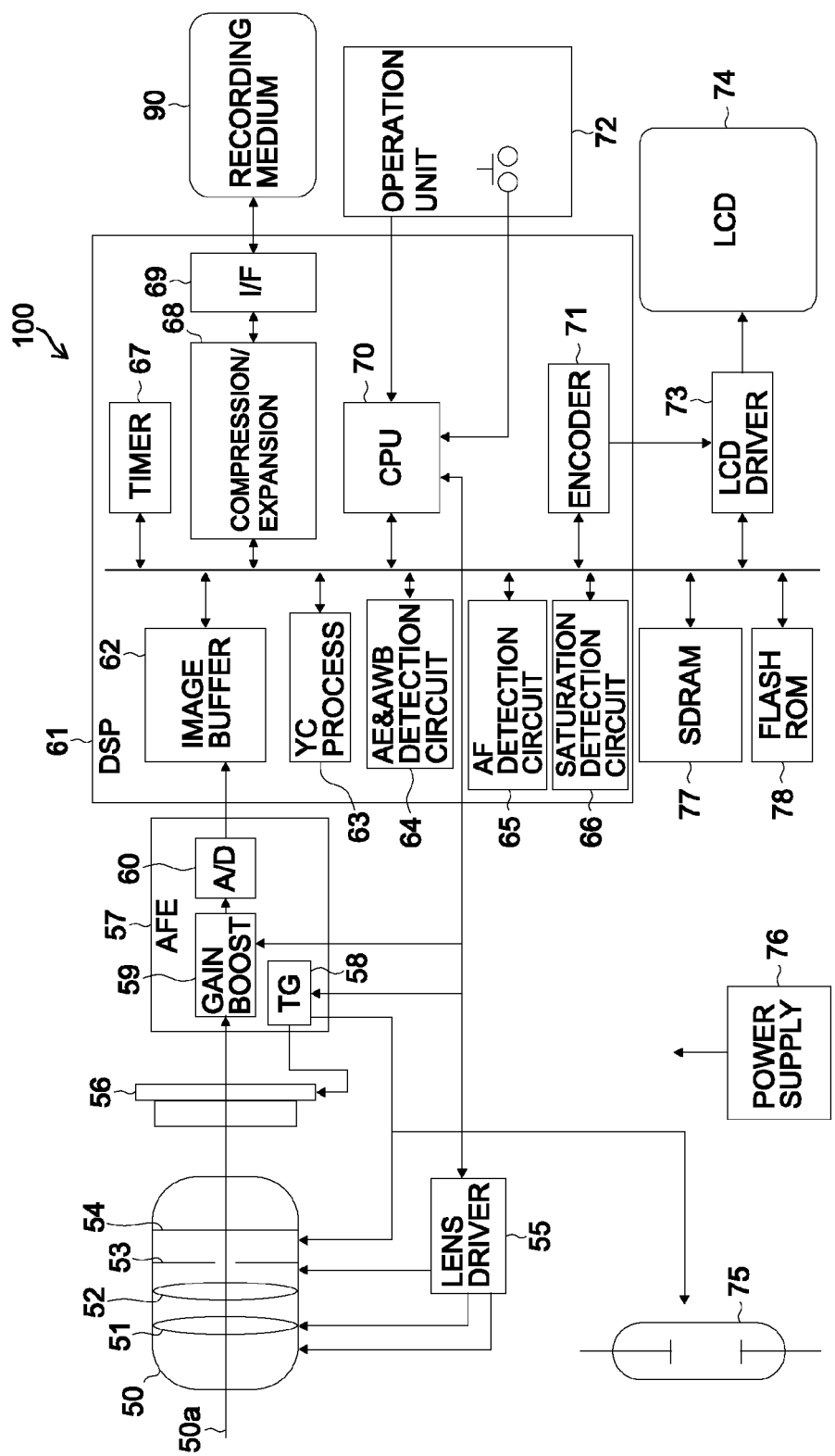
FIG. 1 is a block diagram illustrating an entire configuration of a digital camera according to a first embodiment.

FIG. 1 is a block diagram illustrating an entire configuration of a digital camera 100 as an example of an imaging apparatus according to a first embodiment of the presently disclosed subject matter.

An imaging optical system 50 is configured to include a zoom lens 51, a focus lens 52, an iris 53, and a mechanical shutter 54. A lens driver 55 is configured to include a motor and a drive circuit and drives the zoom lens 51, the focus lens 52, and the iris 53 of the imaging optical system 50. A CCD (Charge Coupled Device) image sensor 56 images an object image focused by the imaging optical system 50. The zoom lens 51 is driven by the lens driver 55 and moves along an optical axis 50a of the imaging optical system 50. Thereby, an object image focused on a light receiving surface of the CCD image sensor 56 is optically variably magnified. The focus lens 52 is driven by the lens driver 55 and moves along the optical axis 50a of the imaging optical system 50. Thereby, focusing is made. The iris 53 is driven by the lens driver 55 and the opening amount (diaphragm value) is changed. Thereby, the amount of light incident on a light receiving surface of the CCD image sensor 56 is controlled. The mechanical shutter 54 switches between allowing and blocking of light with respect to the light receiving surface of the CCD image sensor 56.

The CCD image sensor 56 of the present embodiment is configured as a color CCD in which R (red), G (green), and B (blue) color pixels (photo sensors) are arranged. The CCD image sensor 56 images an object image focused by the imaging optical system 50 and generates an RGB image signal (also called "imaging image") indicating the object image.

An AFE (Analog Front End) circuit 57 is configured to include a timing generator 58 for driving the CCD image sensor 56, a gain boost circuit 59 for boosting the gain of an RGB image signal, and an A/D (analog-digital) conversion circuit 60 for converting the RGB image signal from analog to digital. When a drive signal is supplied from the timing generator 58 to the CCD image sensor 56, a signal charge accumulated in each pixel is read from each pixel by the CCD image sensor 56, and is outputted as an RGB image signal from the CCD image sensor 56. In addition, the timing generator 58 controls a charge storage time (shutter speed) of the CCD image sensor 56.

A DSP (Digital Signal Processor) 61 is configured to include an image buffer 62, a YC process circuit 63, an AE&AWB detection circuit 64, an AF detection circuit 65, a saturation detection circuit 66, a timer 67, a compression/expansion circuit 68, a recording medium interface 69, a CPU (Central Processing Unit) 70, and an encoder 71.

The image buffer 62 includes a RAM (Random Access Memory) and temporarily stores an RGB image signal outputted from the AFE circuit 57 as RAW data.

The YC process circuit 63 fetches an RGB image signal temporarily stored in the image buffer 62 and generates a YC signal including an intensity signal (Y) and color-difference signals (Cr and Cb).

The AE&AWB detection circuit 64 fetches an imaging image (RAW data) temporarily stored in the image buffer 62 and calculates an AE evaluation value (photometric value) indicating a brightness of an imaging image required for AE (automatic exposure) control.

The AF detection circuit 65 fetches an imaging image (RAW data) temporarily stored in the image buffer 62 and calculates an AF evaluation value indicating a contrast of an imaging image required for AF (automatic focusing) control. The AF detection circuit 65 of the present embodiment includes a highpass filter for passing only a high-frequency component of a G signal; an absolute value conversion circuit for converting the high-frequency component to an absolute value; a search area extraction circuit for extracting a signal in a predetermined AF search area (evaluation value calculation area), and an integrating circuit for integrating absolute value data of the high-frequency component in the AF search area. The AF detection circuit 65 outputs the absolute value data in the AF search area integrated by the integrating circuit as an AF evaluation value. Note that a specific example of the AF search area will be described in detail later.

The saturation detection circuit 66 detects saturation of pixel values or intensity values in a specific region of the imaging image. Thereby, the presence or absence of a point light source can be detected. For example, a local maximum value of the pixel values (or a local maximum value of the intensity values) in a specific region in the imaging image is compared with a threshold value. Preferably, an average value of pixel values (or an average value of intensity values) between pixels adjacent to each other in a specific region in the imaging image is calculated and a local maximum value of the average values in the specific region is compared with the threshold value. Note that a specific example of a saturation detecting area (saturation detection area) will be described in detail later. In the following description, the saturation detection area may also be referred to as "point light source presence/absence determination area".

The timer 67 measures time. For example, the timer 67 times a self timer. The compression/expansion circuit 68 fetches an imaging image temporarily stored in the image buffer 62 and performs compression process. In addition, the compression/expansion circuit 68 fetches the compressed imaging image and performs a predetermined expansion process. The recording medium interface 69 reads and writes data to and from a recording medium 90. That is, the recording medium interface 69 writes the compressed imaging image outputted from the compression/expansion circuit 68 to the recording medium 90. In addition, the recording medium interface 69 reads the compressed imaging image from the recording medium 90 and supplies the compression/expansion circuit 68 therewith. According to the present embodiment, the recording medium 90 is detachably loaded into a card slot provided in a main body of the digital camera 100.

The CPU 70 controls each unit of the digital camera 100. The CPU 70 of the present embodiment functions as the evaluation value calculation device which sets a plurality of AF search areas (evaluation value calculation areas) different in size to each other to the imaging image and calculates an evaluation value (AF evaluation value) of a contrast of the imaging image for each AF search area by the AF detection circuit 65 while moving the focus lens 52 along the optical axis 50a by the lens driver 55. Moreover, the CPU 70 of the present embodiment functions as the area selection device which selects a focusing determination area for determining a focusing position of the focus lens 52 from a plurality of AF search areas based on the detection result of the saturation detection circuit 66. In addition, the CPU 70 of the present embodiment functions as the focusing control device which determines the focusing position of the focus lens 52 based on the AF evaluation value in the focusing determination area and moves the focus lens 52 to the focusing position by the lens driver 55.

The encoder 71 fetches an imaging image temporarily stored in the image buffer 62 and converts the imaging image to image data displayable on an LCD 74.

An operation unit 72 is configured to include a release switch, a mode dial, an arrow key, a menu key, an OK key, and a power switch. The release switch is configured to include a two-stage-stroke-type hardware switch enabling so-called "half pressing" and "full pressing". In the half pressing state, a first switch (hereinafter referred to simply as "S1") is turned on; and in the full pressing state, the first switch S1 and a second switch (hereinafter referred to simply as "S2") are turned on. The mode dial switches the mode of the digital camera 100. The arrow key allows upward, downward, leftward and rightward operations to enable various setting instructions to be inputted. The menu key is used to display a menu screen and call a menu function to accept a setting information input. The OK key is used to fix the selected content displayed on the menu screen and input a process execution instruction. The power switch is used to input an instruction to turn on or off the power of the digital camera 100.

An LCD driver 73 is configured to include a drive circuit for driving an LCD (Liquid Crystal Display) 74. A flash 75 emits a flash light under the control of the CPU 70. A power supply 76 supplies electric power to each unit of the digital camera 100. An SDRAM 77 is used as a work area of the CPU 70. A flash ROM 78 stores various kinds of setting information.

Figure 2:
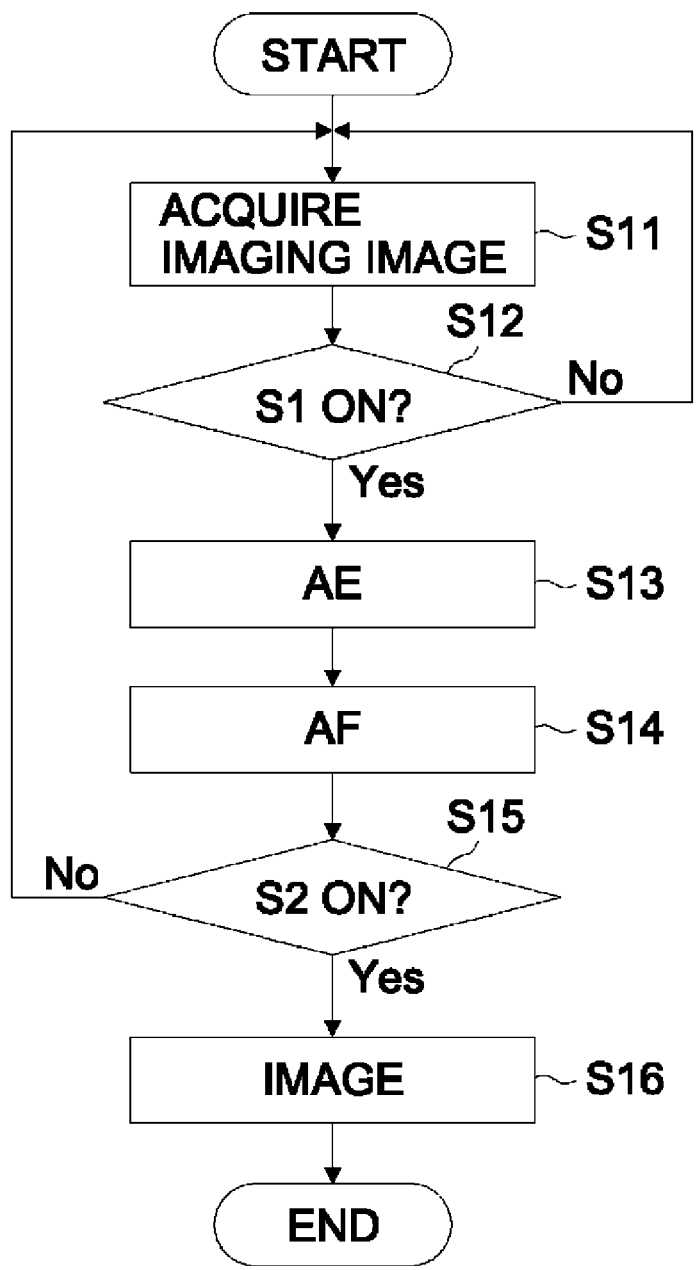
FIG. 2 is a simplified flowchart illustrating a flow of an imaging process example according to the first embodiment.

FIG. 2 is a simplified flowchart illustrating a flow an example of an imaging process. This process is executed by a program under the control of the CPU 70.

In step S11, an imaging image (also called "image signal") is acquired. In this process, the CPU 70 controls the lens driver 55 and the AFE circuit 57; the imaging optical system 50 focuses an object image on the CCD image sensor 56; and the CCD image sensor 56 generates an analog RGB image signal as an imaging image. The RGB image signal is an image signal in a different color of R (red), G (green), and B (blue) and indicates a charge amount accumulated for each pixel of the CCD image sensor 56.

The analog RGB image signal outputted from the CCD image sensor 56 is inputted to the AFE circuit 57 in which gain boost and an analog/digital conversion is performed thereon, and is temporarily stored as RAW data in the image buffer 62. The imaging image is not only displayed as a live view image on the LCD 74 but also used by the AE process and the AF process described later.

In step S12, a determination is made as to whether S1 is on or not. More specifically, a determination is made as to whether or not the release switch is half-pressed. If the release switch is half-pressed, the process goes to step S13, and if the release switch is not half-pressed, the process returns to step S11.

In step S13, AE (automatic exposure) process is performed. In the AE process, an AE evaluation value (photometric value) indicating an object intensity is calculated. In the AE process of the present embodiment, the AE&AWB detection circuit 64 calculates an integrated value of each of the R, G, and B colors in a predetermined photometric area from the RAW data. The calculated integrated value is used as an AE evaluation value to determine exposure conditions. The photometric area is an area for calculating the AE evaluation value set to an image area (an area corresponding to an imaging image in a virtual image surface).

In step S14, AF (automatic focus adjustment) process is performed. This process is described in detail later.

In step S15, a determination is made as to whether S2 is on or not. More specifically, a determination is made as to whether or not the release switch is fully-pressed. If the release switch is fully-pressed, the process goes to step S16, and if the release switch is not fully-pressed, the process returns to step S11.

In step S16, imaging is performed. That is, this imaging is performed under exposure conditions which is determined based on the AE evaluation value and the obtained imaging image is recorded in the recording medium 90.

Figure 3:
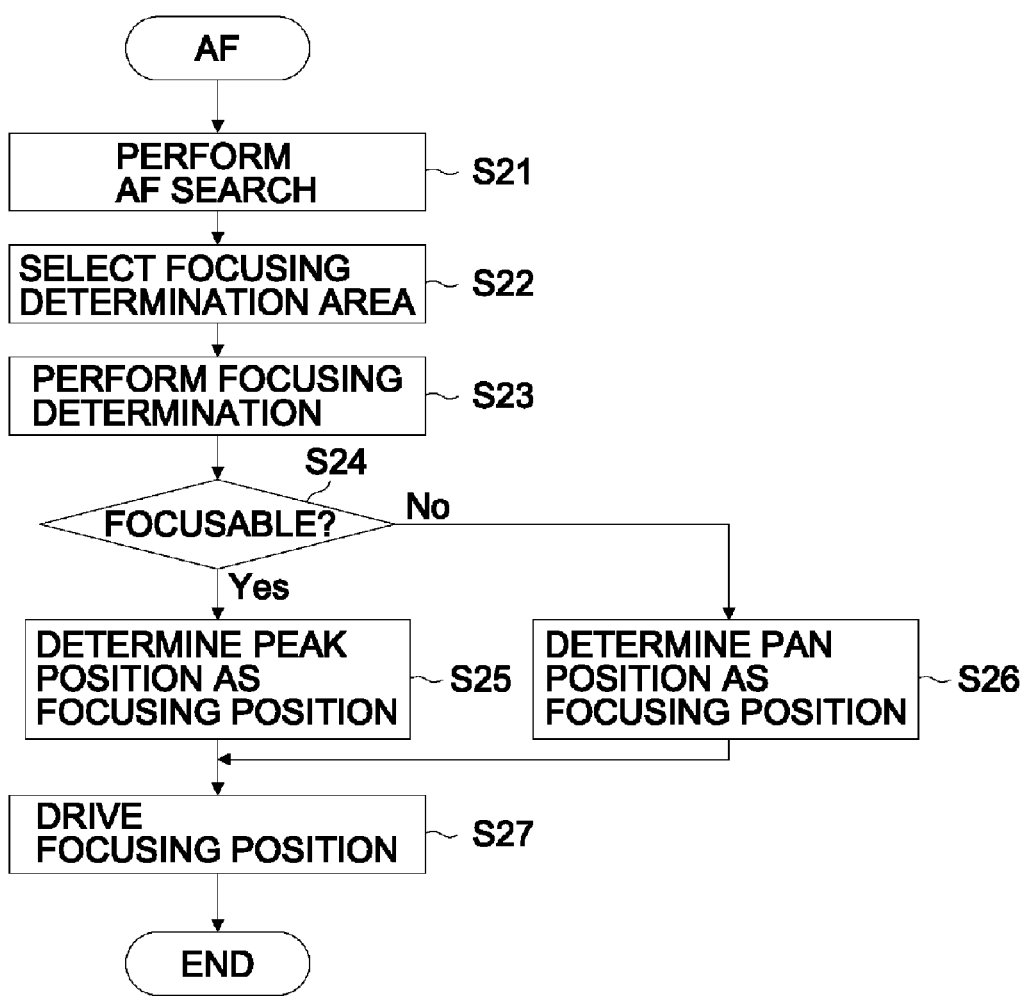
FIG. 3 is a flowchart illustrating a flow of an AF process example according to the first embodiment.

Now, the AF process in step S14 will be described in detail. FIG. 3 is a flowchart illustrating a flow of the AF process according to the present embodiment. This process is executed according to a program under the control of the CPU 70.

In step S21, the AF search process is performed. Although the detail of this process is given later, a brief description thereof is given here. While the lens driver 55 is moving the focus lens 52 along the direction of the optical axis 50a, an AF evaluation value indicating the contrast of the imaging image is calculated for each AF search area (evaluation value calculation area). Moreover, the AF search process of the present embodiment determines the presence or absence of a point light source in the imaging image.

In step S22, focusing determination area selection process is performed. Although the detail of this process is given later, a brief description thereof is given here. Based on the presence or absence of a point light source in the imaging image, a focusing determination area is selected from a plurality of AF search areas.

In step S23, the focusing determination process is performed. The focusing determination process determines the focusing position of the focus lens 52 based on the AF evaluation value in the focusing determination area. More specifically, the focusing position is determined when the focus lens 52 is located at a lens position (peak position) in which the AF evaluation value in the focusing determination area reaches a local maximum value within a range (actual search range) in which the focus lens 52 is moved by the AF search process in step S21.

In step S24, a determination is made as to whether or not to be focusable. In this step, if a peak position can be detected in step S23, a determination is made to be focusable and the process moves to step S25, in which the peak position is determined to be the focusing position; and if a peak position cannot be detected, the process moves to step S26, in which a preliminarily determined pan position is determined to be the focusing position.

In step S27, the lens driver 55 moves the focus lens 52 to the focusing position.

Figure 4:
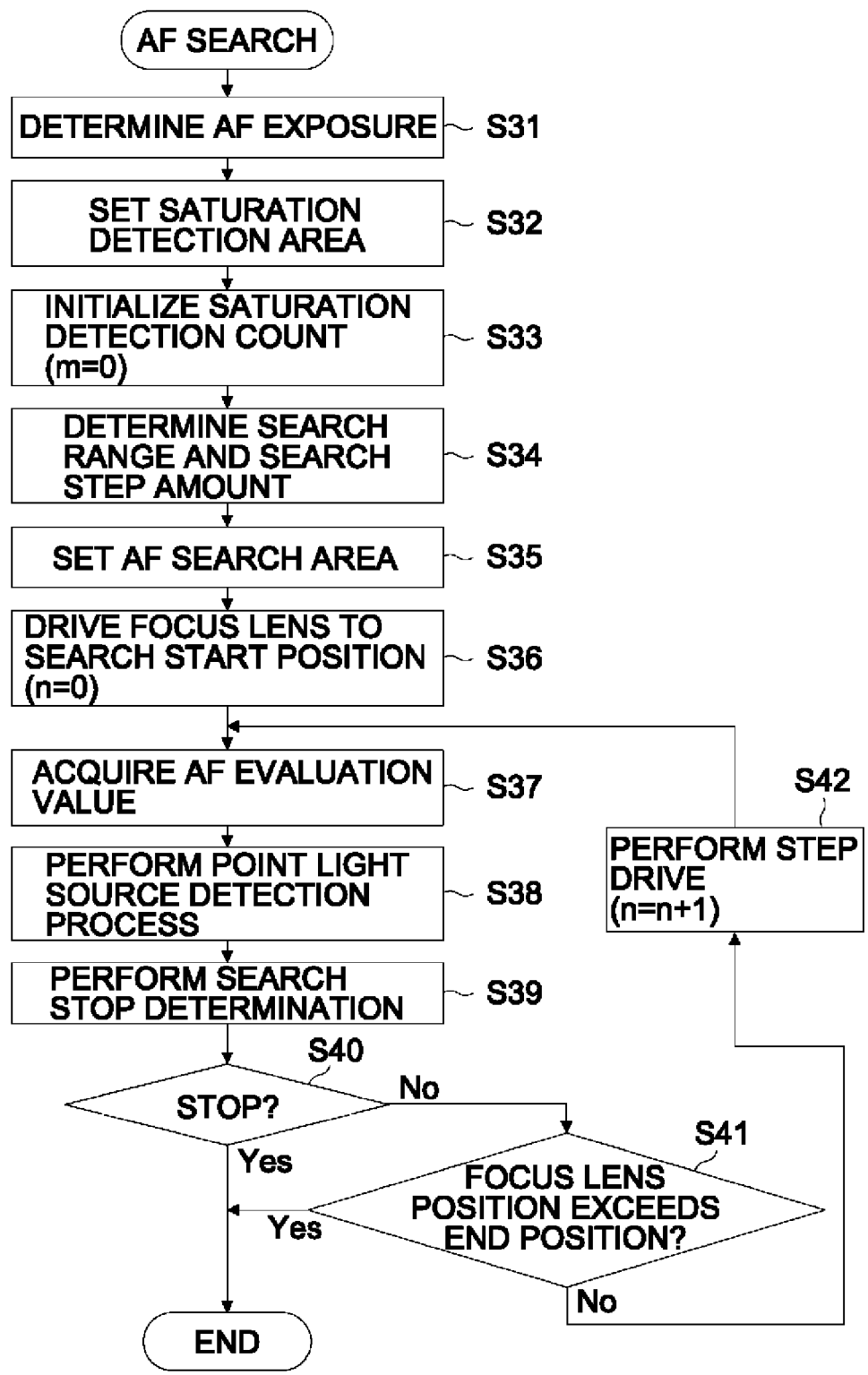
FIG. 4 is a flowchart illustrating a flow of an AF search process example according to the first embodiment.

FIG. 4 is a flowchart illustrating a flow of the AF search process (step S21 of FIG. 3). This process is executed according to a program under the control of the CPU 70.

In step S31, the exposure conditions at the AF search are determined based on the AE evaluation value. For example, an aperture diaphragm, a shutter speed, a frame rate, and a gain boost amount are determined.

Figure 5:
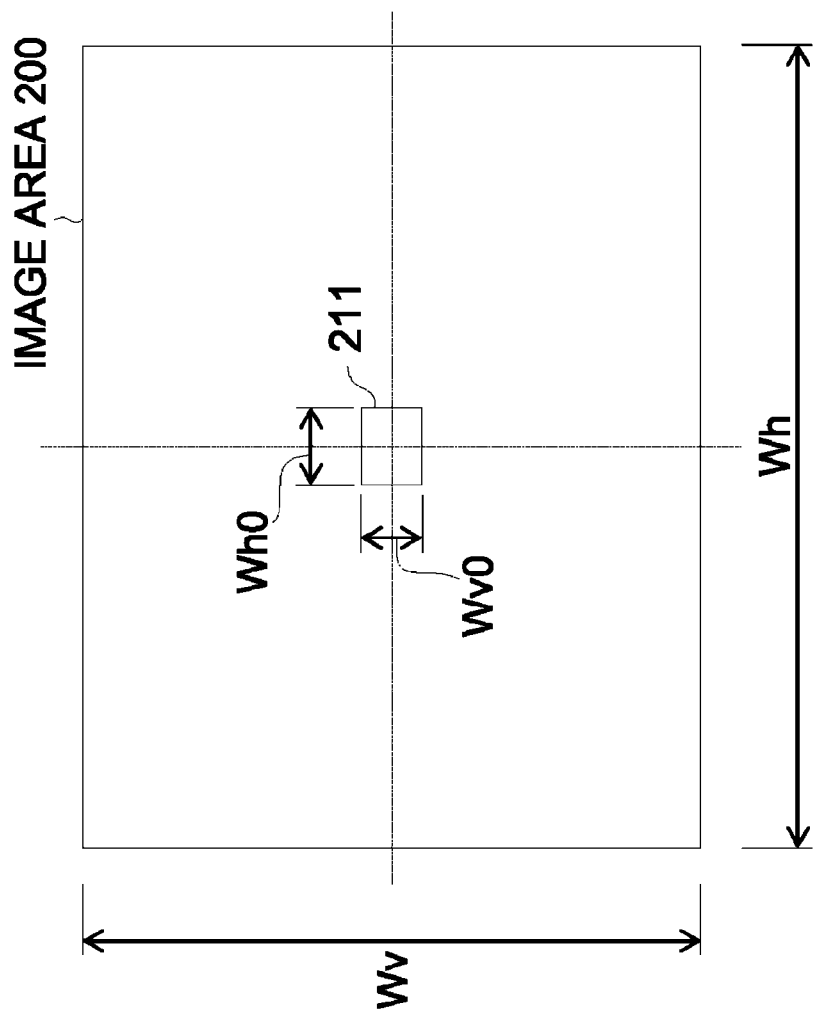
FIG. 5 is an explanatory drawing illustrating an example of a saturation detection area according to the first embodiment.

In step S32, a saturation detection area (point light source presence/absence determination area) is set to the imaging image. According to the present embodiment, information (saturation detection area setting information) indicating the position and the size of the saturation detection area in the image area is supplied to the saturation detection circuit 66. The saturation detection area is an area for determining the presence or absence of a point light source in the imaging image by saturation detection. For example, as illustrated in FIG. 5, a saturation detection area 211 is set at the center of an image area 200. In FIG. 5, the vertical width Wv0 and the horizontal width Wh0 of the saturation detection area 211 each are 10% of the vertical width Wv and the horizontal width Wh of the image area 200 respectively.

In step S33, a saturation detection count m is initialized (m=0).

In step S34, a search range (a search start range and a search end range) and a search step amount are determined. The search range is a maximum range in which the focus lens 52 is moved for calculating the AF evaluation value. The search step amount is the amount of movement for each step of the focus lens 52 when the AF evaluation value is calculated.

Figure 6:
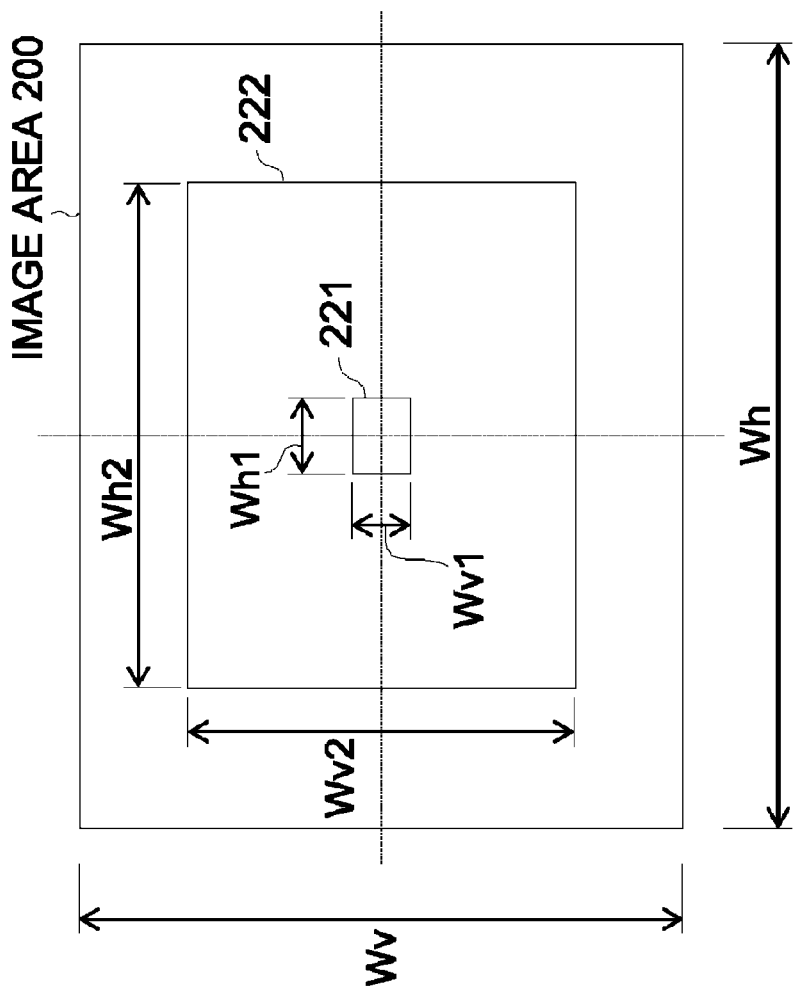
FIG. 6 is an explanatory drawing illustrating an example of an AF search area according to the first embodiment.

In step S35, a plurality of AF search areas (evaluation value calculation areas) is set to the imaging image. According to the present embodiment, information (AF search area setting information) indicating the position and the size of each of the plurality of AF search areas in the image area is supplied to the AF detection circuit 65. The AF search area is an area for calculating the AF evaluation value. For example, as illustrated in FIG. 6, a first AF search area 221 is set at the center of the image area 200 as well as a second AF search area 222 larger than the first AF search area 221 is set so as to include the first AF search area 221. In FIG. 6, the vertical width Wv1 and the horizontal width Wh1 of the first AF search area 221 each are 10% of the vertical width Wv and the horizontal width Wh of the image area 200 respectively. The vertical width and the horizontal width of the first AF search area 221 are not particularly limited, but are set to be 10% or less of the vertical width and the horizontal width of the image area to eliminate an influence of "rear focusing". In addition, the vertical width Wv2 and the horizontal width Wh2 of the second AF search area 222 each are 50% of the vertical width Wv and the horizontal width Wh of the image area 200 respectively. The size of the second AF search area 222 is not particularly limited, but is preferable to be double or more the size of the first AF search area 221.

Note that the first AF search area 221 is small in size and has a small number of pixels. Therefore, if there is a point light source in the first AF search area 221, a lens position which is not actually the focusing position is misrecognized as the focusing position. In light of this, according to the present embodiment, a saturation detection area 211 having the same position and size of the first AF search area 221 is set and the presence or absence of a point light source is detected in the first AF search area 221. Note that a saturation detection area 211 which includes the first AF search area 221 and is larger than the first AF search area 221 may be set. In this case, even if there is a point light source, a larger AF search area sufficiently reduces the influence on the AF evaluation value, and thus a second AF search area 222 larger than the first AF search area 221 is set.

FIG. 7 illustrates another example of the AF search area. According to present embodiment, a plurality of divided areas arranged two-dimensionally in a vertical direction and a horizontal direction with respect to the image area 200 is provided. Then, one or more of the divided areas are selected from the plurality of divided areas and are set to the AF search area. In FIG. 7, in an entire AF search area 228 (entire divided areas 0 to 48), a central divided areas 24 is set to a first AF search area 226 and the 5×5 divided areas (8 to 12, 15 to 19, 22 to 26, 29 to 33, and 36 to 40) are set to a second AF search area 227. Note that if the second AF search area 227 is selected as the focusing determination area, in the focusing determination (step S23 of FIG. 3), for example, the focusing position is determined based on an average value of the AF evaluation values of the 5×5 divided areas constituting the second AF search area 227.

In step S36, the lens driver 55 moves the focus lens 52 to the search start position to initialize the search step count n (n=0).

In step S37, the AF detection circuit 65 calculates the AF evaluation value for each AF search area. According to present embodiment, the first AF evaluation value indicating the contrast of the image in the first AF search area 221 and the second AF evaluation value indicating the contrast of the image in the second AF search area 222 are calculated. The CPU 70 acquires an AF evaluation value for each AF search area from the AF detection circuit 65.

Figure 8:
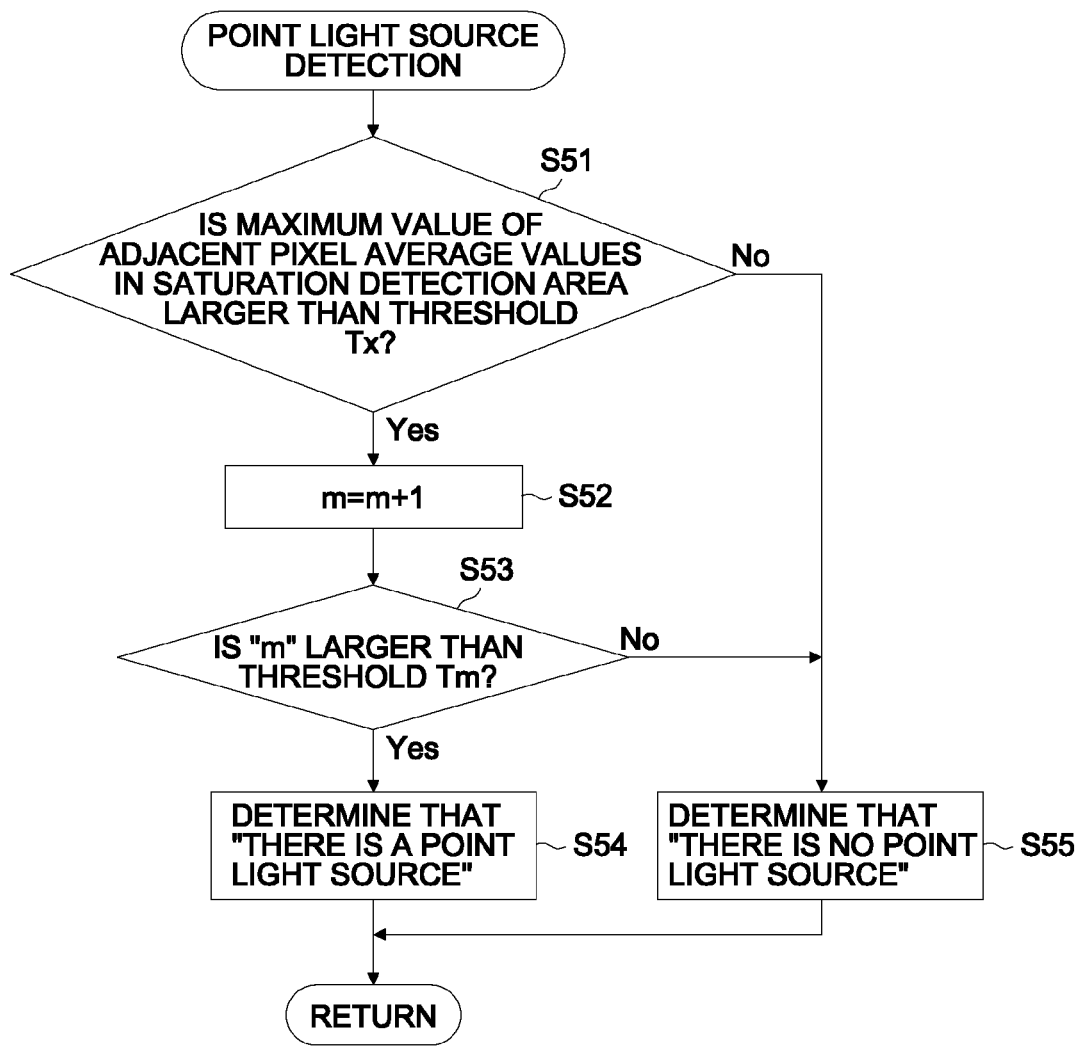
FIG. 8 is a flowchart illustrating a flow of an example of a point light source detection process according to the first embodiment.

In step S38, the point light source detection process is performed. The detail of this process is illustrated in FIG. 8.

In step S51, a determination is made as to whether or not a pixel value saturation occurs in the saturation detection area. According to the present embodiment, an average value of pixel values between pixels adjacent to each other in the saturation detection area (hereinafter referred to simply as "adjacent pixel average value") is calculated and a determination is made as to whether or not a local maximum value of the adjacent pixel average values in the saturation detection area is larger than a threshold Tx. Note that a pixel value may be compared with a saturation value for each pixel, but in this case, a misdetection due to a damaged pixel may occur. This is because a high resolution image does not have a local maximum sized point light source such as 1 to 2 pixels. If the pixel value is 4 bits and the saturation value is "255", the threshold Tx is not particularly limited but is set to a value near the saturation value (e.g., "249"). According to the present embodiment, the imaging image includes an RGB image signal including a different color of R, G, and B, and thus an adjacent pixel average value of at least one color (e.g., G) from R, G, and B is used to determine saturation. Note that an average value of intensity values between pixels adjacent to each other (hereinafter referred to simply as "adjacent intensity average value") is calculated from the RGB image signal and the adjacent intensity average values may be compared with a threshold value of intensity.

If a determination is made that saturation occurs (Yes in step S51), the process moves to step S52, in which the saturation detection count m is incremented (m=m+1). Then, if the saturation detection count m exceeds the threshold Tm (e.g., once), the process moves to step S54, in which a determination is made that "there is a point light source". If a determination is made that saturation does not occur (No in step S51) and even if a determination is made that saturation occurs but if the saturation detection count m is equal to or less than the threshold Tm, the process moves to step S55, in which a determination is made that "there is no point light source". As described above, according to the present embodiment, saturation occurrence is determined for each AF search step, namely, for each position in which an AF evaluation value of the focus lens 52 is calculated as well as only when a determination is made that saturation occurs in a plurality of AF search steps, a determination is made that "there is a point light source". Thereby, a misdetection of a point light source can be surely prevented and focusing accuracy can be improved.

Figure 9:
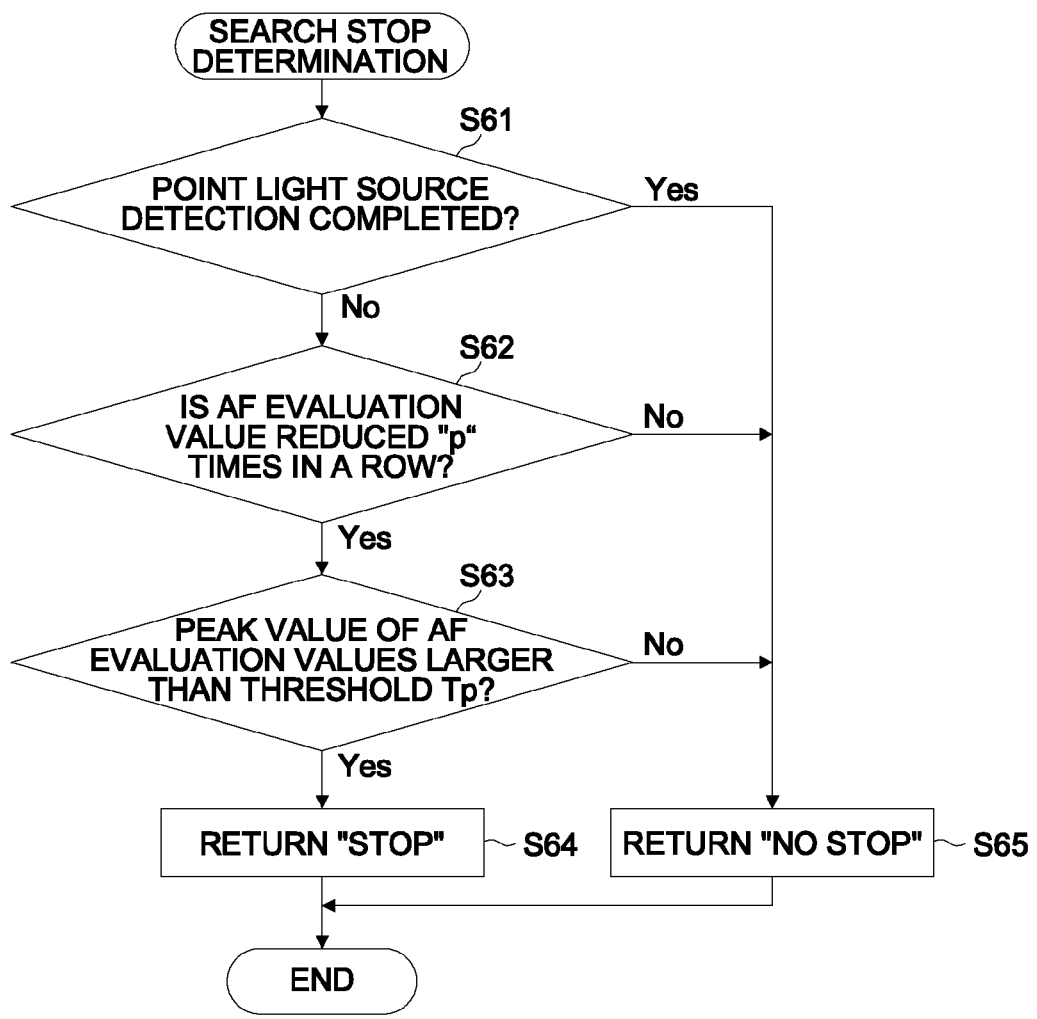
FIG. 9 is a flowchart illustrating a flow of an example of a search stop determination process according to the first embodiment.

In step S39 of FIG. 4, the search stop determination process is performed. The detail of this process is illustrated in FIG. 9. In step S61, a determination is made as to whether or not the point light source detection has been completed. If the point light source detection has been completed, the process moves to step S65, in which "no stop" is set to the search stop determination result. If the point light source detection has not been completed, the process moves to step S62. In step S62, after the AF evaluation value is increased, a determination is made as to whether or not the AF evaluation value is reduced a specified number of times ("p" times) in a row, namely, a determination is made as to whether or not a peak value (local maximum value) of the AF evaluation values is detected. In step S63, a determination is made as to whether or not the peak value of the AF evaluation values is larger than a threshold Tp for determining the peak position of the focus lens 52. If the peak position of the AF evaluation value is detected and if the peak value is larger than the threshold Tp (Yes in step S62 and Yes in step S63), namely, if the peak position of the focus lens 52 is detected, "stop" is set to the search stop determination result. If the peak position of the focus lens 52 is not detected (No in step S62 or No in step S63), "no stop" is set to the search stop determination result.

In step S40 of FIG. 4, if the determination result of the search stop determination process in step S39 is "stop", the AF search process ends; and if the determination result thereof is "no stop", the process moves to step S41. That is, in order to shorten the AF search process time, when the peak position of the focus lens 52 is detected in the search stop determination process (in step S39), the AF search process stops.

In step S41, a determination is made as to whether or not the position of the focus lens 52 exceeds the search end position. If the position thereof does not exceed the search end position, the process moves to step S42; and if the position thereof exceeds the search end position, the AF search process ends. In step S42, the lens driver 55 drives the focus lens 52 to perform step drive for moving the focus lens 52 to a next AF evaluation value calculation position and increments the search step count n (n=n+1).

Figure 10:
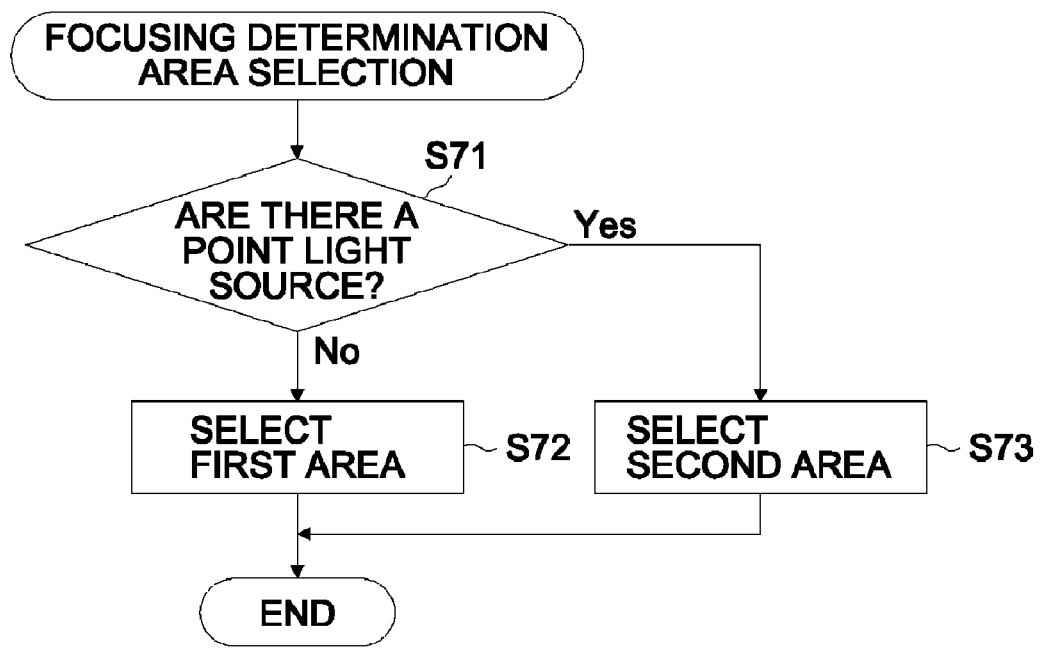
FIG. 10 is a flowchart illustrating a flow of an example of a focusing determination area selection process according to the first embodiment.

FIG. 10 is a flowchart illustrating a flow of the focusing determination area selection process (step S22 of FIG. 3).

If a point light source is not detected in the AF search (in step S21 of FIG. 3) in step S71 (i.e., a determination is made that "there is no point light source" in the point light source detection process of FIG. 8), the process moves to step S72, in which the first AF search area is selected as the focusing determination area. If a point light source is detected in the AF search, the process moves to step S73, in which the second AF search area is selected as the focusing determination area. That is, if a point light source is not detected in the saturation detection area, the first AF search area in the center of the image area is selected as the focusing determination area; and if a point light source is detected in the saturation detection area, the second AF search area larger than the first AF search area is selected as the focusing determination area.

Note that the description has been made by taking an example in which the saturation detection area is the same as the first AF search area, but the presently disclosed subject matter is not particularly limited to this example. For example, a saturation detection area which includes the first AF search area and is larger than the first AF search area may be set.

Second Embodiment

Now, the second embodiment will be described. The following description focuses only on a portion different from that of the first embodiment. The present embodiment is different in the AF search area setting from the first embodiment.

Figure 11:
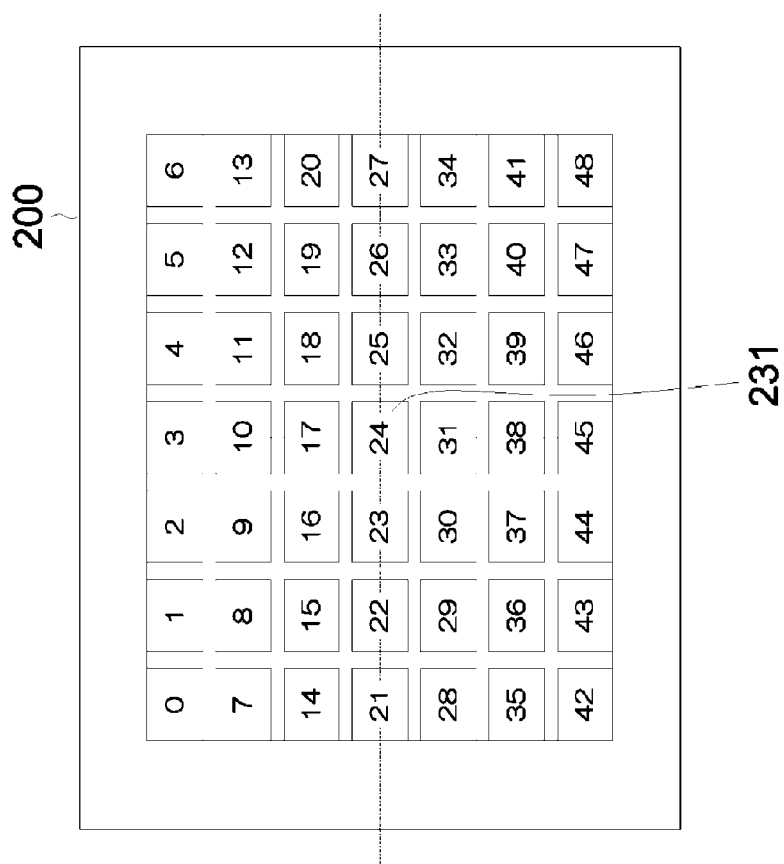
FIG. 11 is an explanatory drawing illustrating an example of a saturation detection area according to a second embodiment.

FIG. 11 illustrates a saturation detection area 231 and FIG. 12 illustrates AF search areas 241 and 242. In the AF search area setting (in step S35 of FIG. 4), a first AF search area 241 is set in the center of the image area 200 as illustrated in FIG. 12. The second AF search area 242 is larger in size than the first AF search area 241 and is not overlapped with the first AF search area 241. According to the present embodiment, the second AF search area 242 is arranged around the first AF search area 241.

Note that the saturation detection area 231 illustrated in FIG. 11 has the same position and size as the first AF search area 241. However, the size of the saturation detection area 231 may be slightly larger than the size of the first AF search area 241. Preferably, the size of the second AF search area 242 is double or more the size of the first AF search area 241.

According to the present embodiment, essentially, if a determination is made that there is no point light source in the first AF search area 241 arranged in the center of the image area 200, the first AF search area 241 is selected as the focusing determination area; and if a determination is made that there is a point light source in the first AF search area 241, the second AF search area 242 which is larger than the first AF search area 241 and is not overlapped with the first AF search area 241 is selected as the focusing determination area.

Third Embodiment

Now, the third embodiment will be described. The following description focuses only on a portion different from that of the first embodiment. The present embodiment is different from the first embodiment in the saturation detection area setting, the AF search area setting, the point light source detection process, and the focusing determination area selection.

Figure 13:
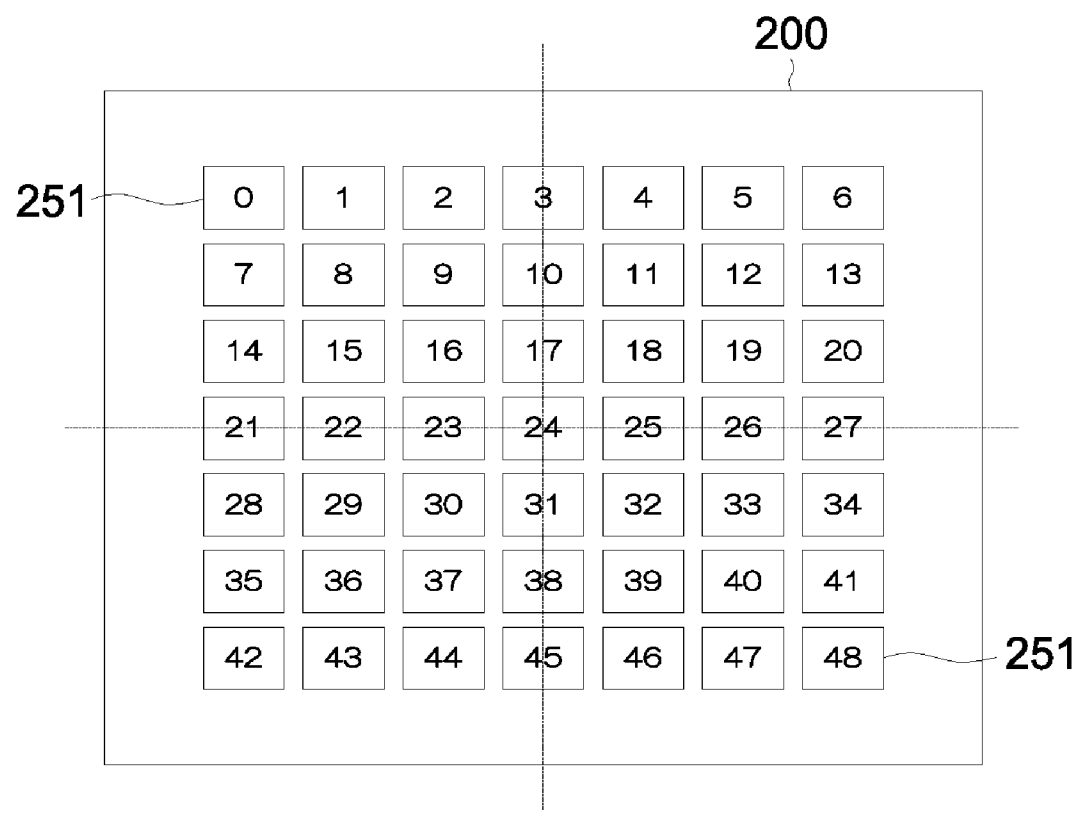
Figure 14:
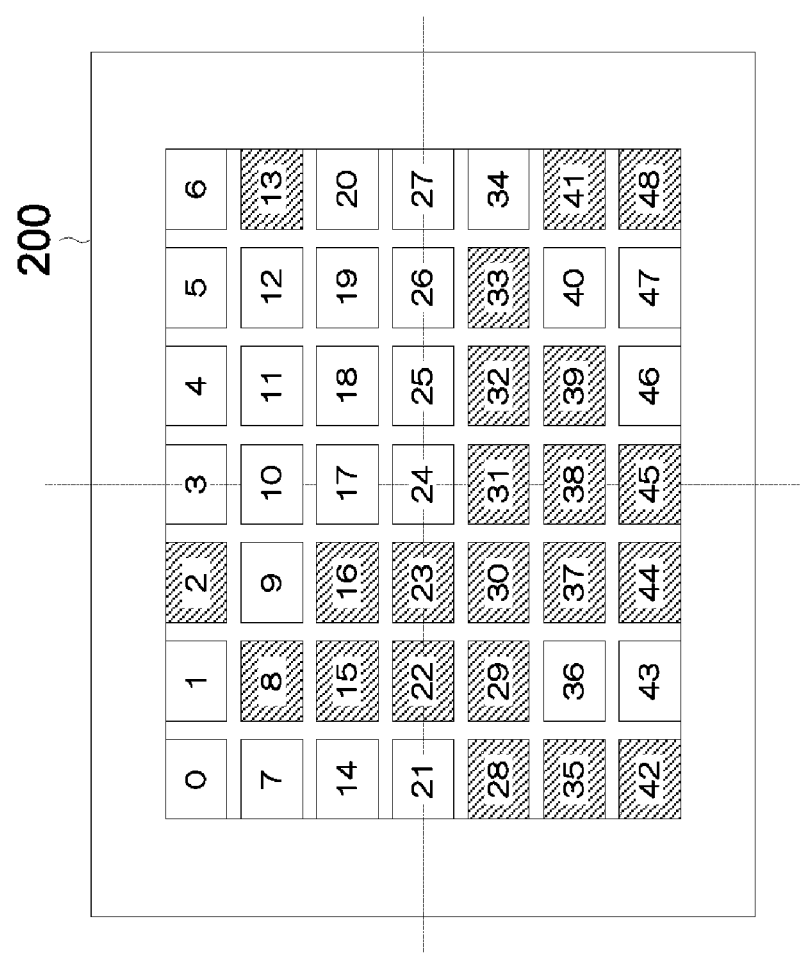
FIG. 14 is an explanatory drawing illustrating an example of the AF search area according to the third embodiment.

FIG. 13 illustrates an example of a saturation detection area arrangement, and FIG. 14 illustrates an example of an AF search area arrangement.

In the saturation detection area setting (in step S32 of FIG. 4), a 7×7 matrix of divided areas (numbers 0 to 48) arranged two-dimensionally in a vertical direction and a horizontal direction in the image area 200 is set as a saturation detection area 251 as illustrated in FIG. 13. That is, a plurality of saturation detection areas 251 not overlapped to each other with respect to the imaging image is set. The size of each of the plurality of divided areas is the same. Note that the number of divided saturation detection areas 251 is not particularly limited to 7×7. Note also that the vertical width and the horizontal width of each saturation detection area 251 are not particularly limited, but in the present embodiment, are set to be 10% or less of the vertical width and the horizontal width of the image area 200.

In the AF search area setting (in step S35 of FIG. 4), each of the 7×7 matrix of divided areas (numbers 0 to 48) is set as the AF search area as illustrated in FIG. 13. That is, a plurality of AF search areas not overlapped to each other with respect to the imaging image is set.

Figure 15:
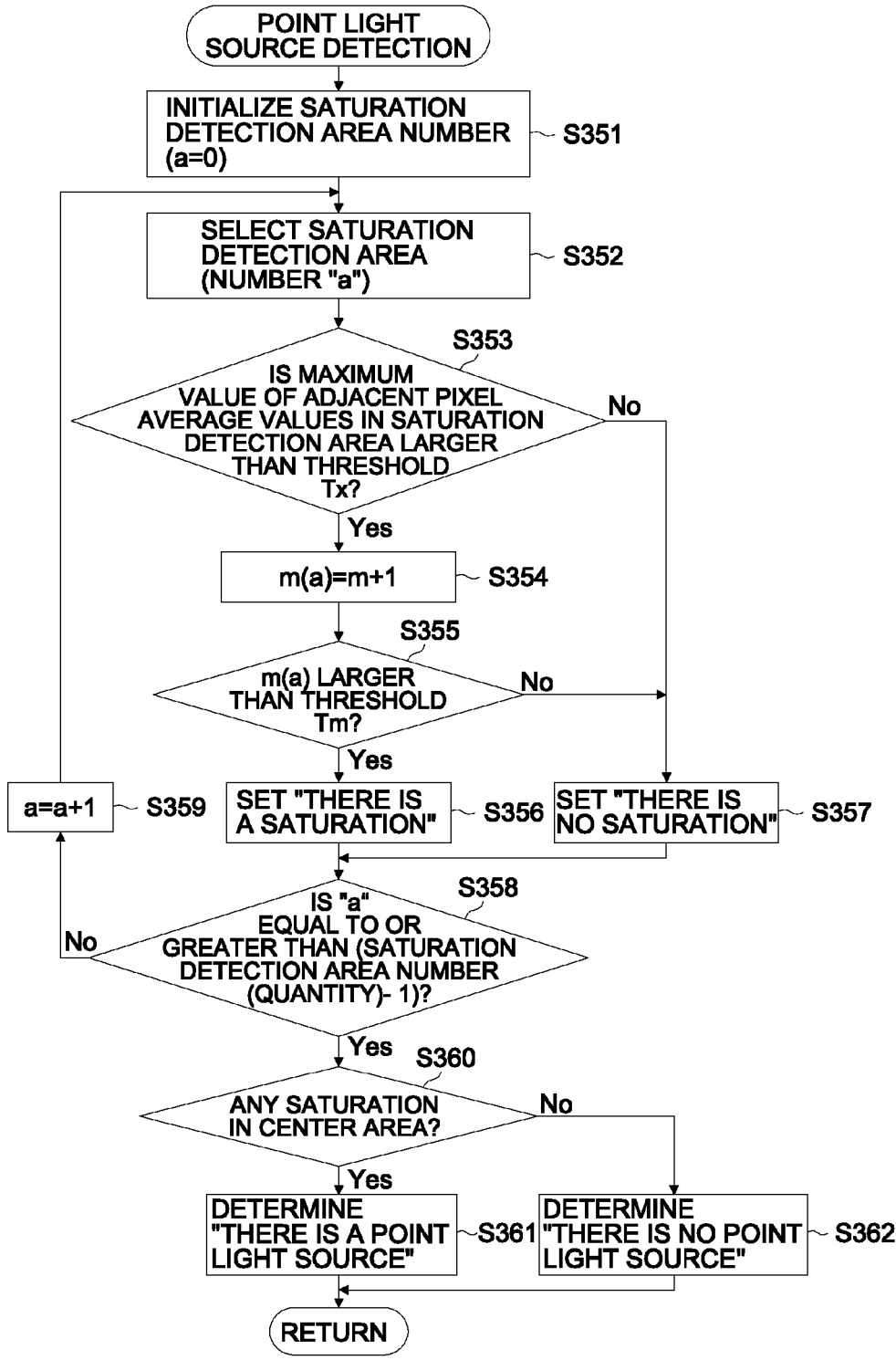
FIG. 15 is a flowchart illustrating a flow of an example of a point light source detection process according to the third embodiment.

FIG. 15 illustrates a flow of an example of the point light source detection process (step S38 of FIG. 4) according to the present embodiment.

In step S351, the saturation detection area number "a" is initialized (a=0). In step S352, the saturation detection area of the number a is selected as the saturation detection area of interest. The step S353 is the same as the step S51 of FIG. 8 and has already been described in the first embodiment. Therefore, the description is omitted here. In step S353, if a local maximum value of adjacent pixel average values in the saturation detection area of interest is determined to be larger than threshold Tx, the process moves to step S354, in which the saturation detection count m(a) of the saturation detection area of interest is incremented. Note that according to the present embodiment, in step S33 of FIG. 4, the saturation detection count m(a) is initialized for each saturation detection area of interest (m(a)=0). In step S355, the saturation detection count m(a) is compared with the threshold Tm. If the saturation detection count m(a) is larger than the threshold Tm, the process moves to step S356, in which "there is a saturation" is set to the saturation determination result. If the saturation detection count m(a) is equal to or less than the threshold Tm, the process moves to step S357, in which "there is no saturation" is set to the saturation determination result. In step S358, the saturation detection area number a is compared with ((saturation detection area number)−1). In the case of FIG. 13, the number of saturation detection areas is "49". That is, a determination is made as to whether or not the saturation detection is performed in all the saturation detection areas. If there is a saturation detection area in which the saturation detection has not been performed, the process moves to step S359, in which the saturation detection area number a is incremented. Then, the process returns to step S352. If the saturation detection is performed in all the saturation detection areas, the process moves to step S360. In step S360, a determination is made as to whether or not "there is a saturation" in the saturation detection area in the center of the image area (divided area number 24 in FIG. 14). If "there is a saturation", the process moves to step S361, in which a determination is made that "there is a point light source"; and if "there is no saturation", the process moves to step S362, in which a determination is made that "there is no point light source".

According to the present embodiment, the saturation detection area is set to have substantially the same size and position as those of the AF search area in the image area 200. That is, the point light source detection process is performed for each AF search area.

Figure 16:
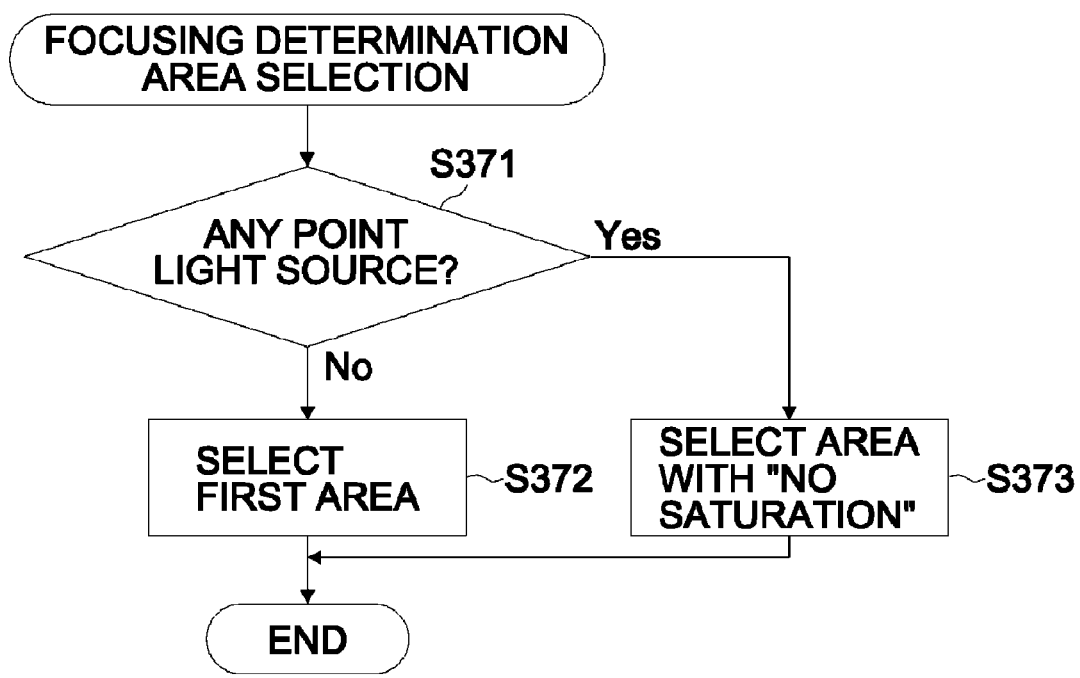
FIG. 16 is a flowchart illustrating a flow of an example of a focusing determination area selection process according to the third embodiment.

FIG. 16 illustrates a flow of an example of the focusing determination area selection process (step S22 of FIG. 3) according to the present embodiment. In step S371, a determination is made as to whether or not the point light source detection result of the first saturation detection area (divided areas number 24) is "there is a point light source". If "there is no point light source", the process moves to step S372, in which the first saturation detection area (divided area number 24) is selected as the focusing determination area. If "there is a point light source", the process moves to step S373, in which the plurality of saturation detection areas determined that "there is no point light source" is selected as the focusing determination area.

In FIG. 14, the areas determined that "there is no point light source" are shaded. In step S373, of the areas determined that "there is no point light source", a plurality of areas closest to the divided area 24 in the center of the image area 200 (e.g., the divided area numbers 16, 23, and 30 to 32 adjacent to the central divided area 24) are selected as the focusing determination area. If these areas (16, 23, and 30 to 32) are also determined that there is a point light source, a plurality of areas next closest to the central divided area 24 (e.g., divided area numbers 8, 15, 22, 29, 33, and 37 to 39) are selected as the focusing determination area.

According to the present embodiment, the focusing position is determined using only the areas where it is determined that "there is no point light source" and thus the influence of a point light source can be completely eliminated.

Fourth Embodiment

The following description focuses only on a portion different from that of the third embodiment. The present embodiment is different from the third embodiment in the AF search area setting and the focusing determination area selection.

Figure 17:
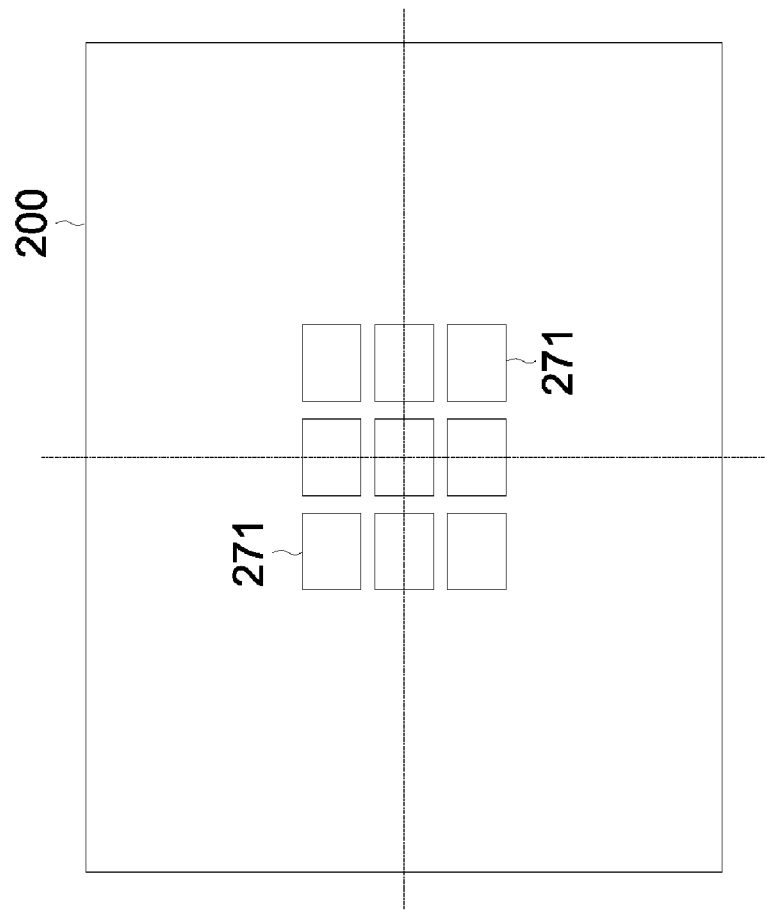
FIG. 17 is an explanatory drawing illustrating an example of a saturation detection area according to a fourth embodiment.
Figure 18:
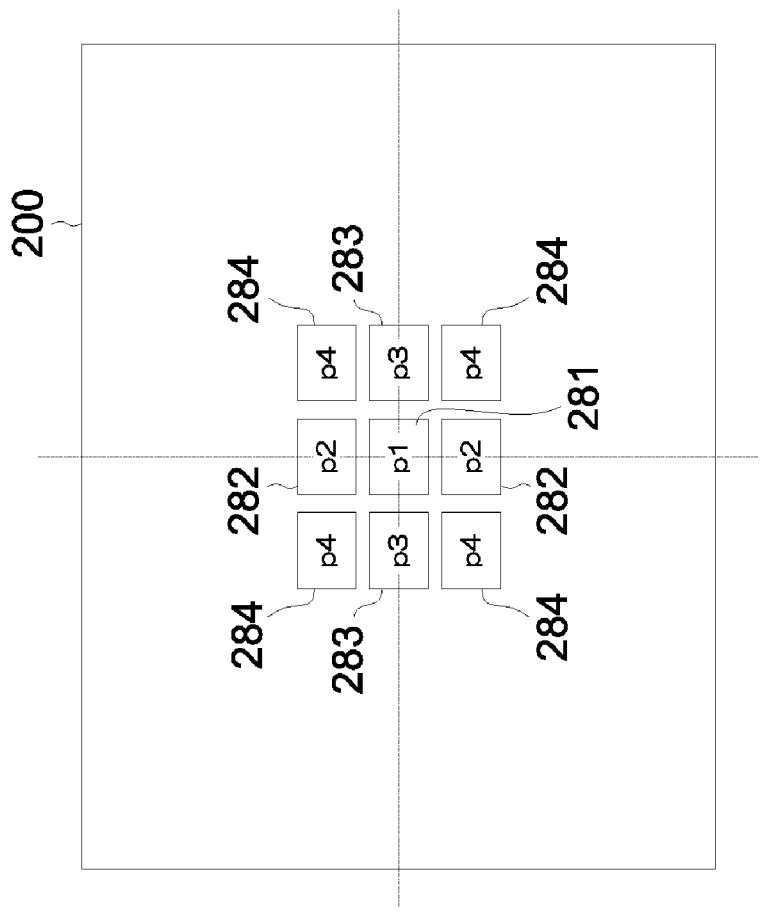
FIG. 18 is an explanatory drawing illustrating an example of an AF search area according to the fourth embodiment.

As illustrated in FIG. 17, a total of nine divided areas 271 in a 3×3 matrix are set as the saturation detection area in the image area 200. As illustrated in FIG. 18, AF search areas 281 to 284 each assigned to respective priorities 1 to 4 (p1 to p4 in FIG. 18) are set in the image area 200. The AF search area 281 (first AF search area) having priority 1 includes one divided area located at the center of the image area 200. AF search areas 282 (second AF search areas) having priority 2 include two divided areas adjacent up and down to the first AF search area 281 in the image area 200. AF search areas 283 (third AF search areas) having priority 3 include two divided areas adjacent right and left to the first AF search area 281 in the image area 200. AF search areas 284 (fourth AF search areas) having priority 4 include four divided areas adjacent obliquely to the first AF search area 281 in the image area 200. Here, priority "1" (p1) is the highest and priority "4" (p4) is the lowest.

In the saturation detection area setting (in step S32 of FIG. 4), a 3×3 matrix of divided areas 271 arranged two-dimensionally in a vertical direction and a horizontal direction in the image area 200 is set as the saturation detection area as illustrated in FIG. 17. Note that the number of divided areas 271 and the arrangement thereof are not particularly limited to this.

In the AF search area setting (in step S35 of FIG. 4), AF search areas 281 to 284 each assigned to respective priorities 1 to 4 are set in the image area 200 as illustrated in FIG. 18. Here, each of the AF search areas 281 to 284 includes one or a plurality of divided areas 271 illustrated in FIG. 17.

Figure 19:
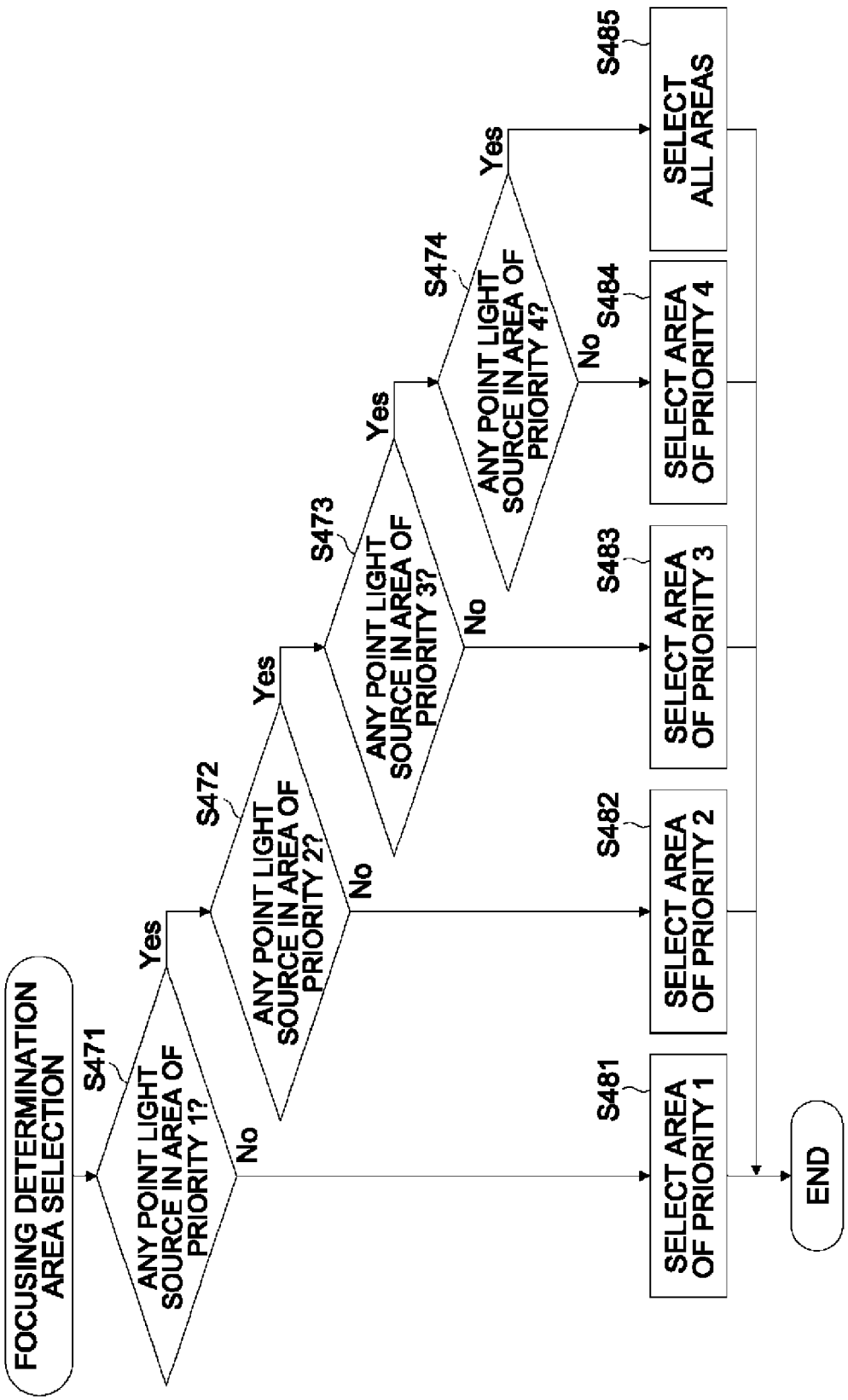
FIG. 19 is a flowchart illustrating a flow of an example of a focusing determination area selection process according to the fourth embodiment.

FIG. 19 illustrates a flow of an example of the focusing determination area selection process (step S22 of FIG. 3). In step S471, a determination is made as to whether or not there is a point light source in the first AF search area 281 to which priority 1 is assigned. If there is no point light source in the first AF search area 281, the process moves to step S481, in which the first AF search area 281 is selected. If there is a point light source in the first AF search area 281, the process moves to step S472. In step S472, a determination is made as to whether or not there is a point light source in the second AF search area 282 to which priority 2 is assigned. If there is no point light source in the second AF search area 282, the process moves to step S482, in which the second AF search area 282 is selected. If there is a point light source in the second AF search area 282, the process moves to step S473. In step S473, a determination is made as to whether or not there is a point light source in the third AF search area 283 to which priority 3 is assigned. If there is no point light source in the third AF search area 283, the process moves to step S483, in which the third AF search area 283 is selected. If there is a point light source in the third AF search area 283, the process moves to step S474. In step S474, a determination is made as to whether or not there is a point light source in the fourth AF search area 284 to which priority 4 is assigned. If there is no point light source in the fourth AF search area 284, the process moves to step S484, in which the fourth AF search area 284 is selected. If there is a point light source in the fourth AF search area 284, the process moves to step S485, in which all AF search areas 281 to 284 are selected.

As described above, according to the present embodiment, the first AF search area 281 having the highest priority and the smallest area is set in the center of the image area 200. In addition, around the first AF search area 281, the second AF search areas 282, the third AF search areas 283, and the fourth AF search areas 284 which are not overlapped with the first AF search area 281, are larger in area than the first AF search area 281, and are lower in priority than the first AF search area 281 are set. Then, of the AF search areas including no point light source, an AF search area having the highest priority is selected as the focusing determination area. Alternatively, if there is a point light source in all AF search areas, all AF search areas are selected.

If the focusing position is determined in an area which has no point light source but is far away from the center of the angle-of-view range, the focusing position is susceptible to the influence of rear focusing due to the background. However, the present embodiment can suppress the influence of rear focusing as much as possible while eliminating the influence of a point light source.

Fifth Embodiment

Figure 20:
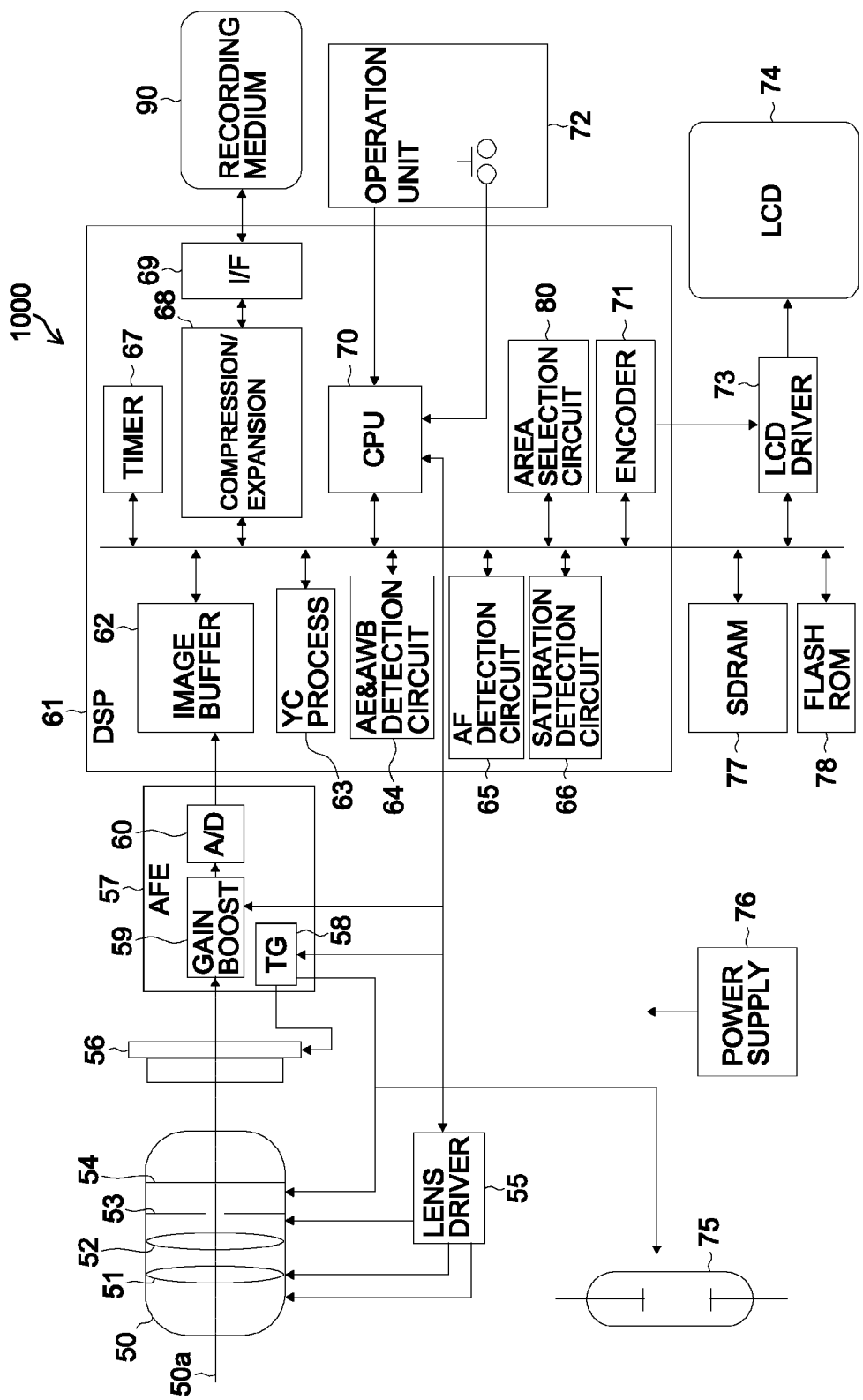
FIG. 20 is a block diagram illustrating an entire configuration of a digital camera according to a fifth embodiment.
Figure 22A:
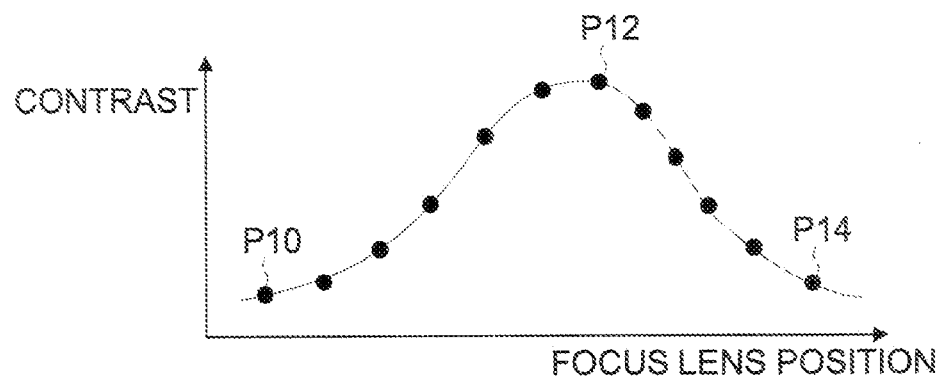
FIGS. 22A-22D are explanatory drawings explaining a focusing position determination in a normal scene using a conventional technique.
Figure 22B:
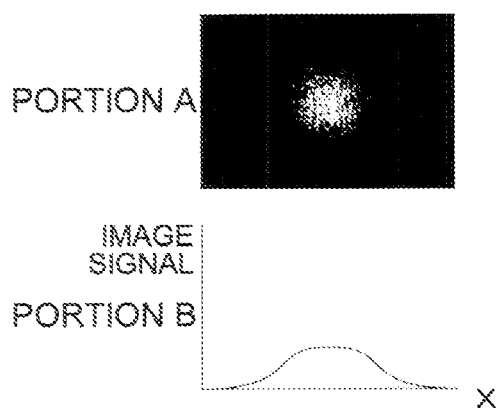
Figure 22C:
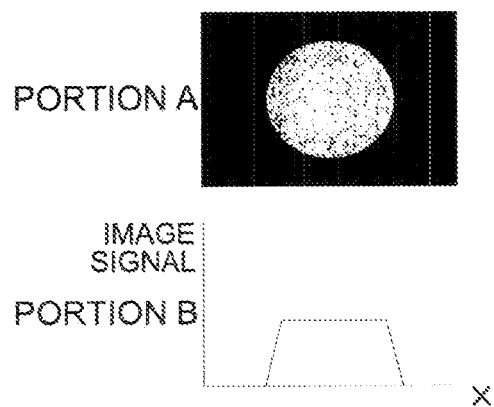
Figure 22D:
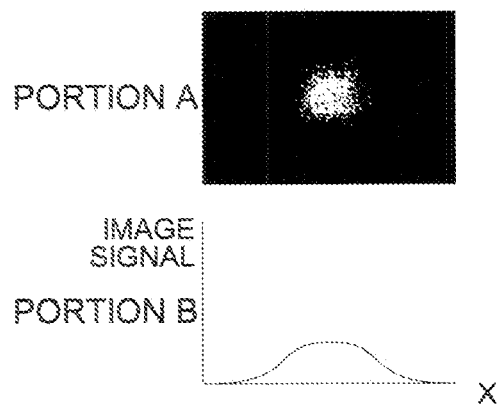
Figure 23A:
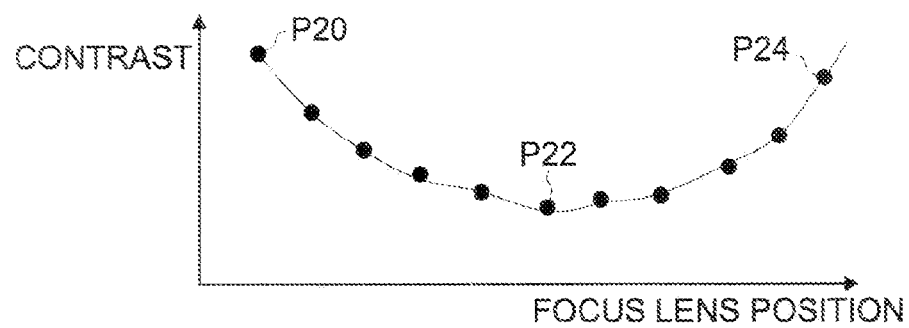
FIGS. 23A-23D are explanatory drawings explaining a problem with the focusing position determination in a scene with a point light source using a conventional technique.
Figure 23B:
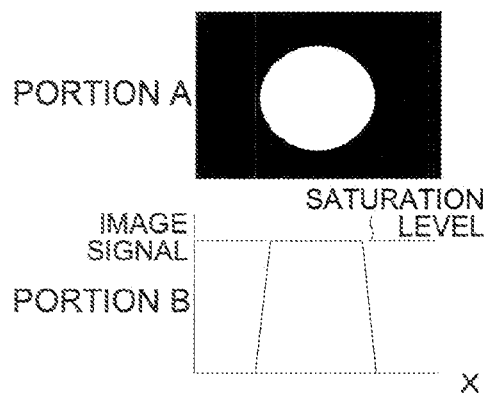
Figure 23C:
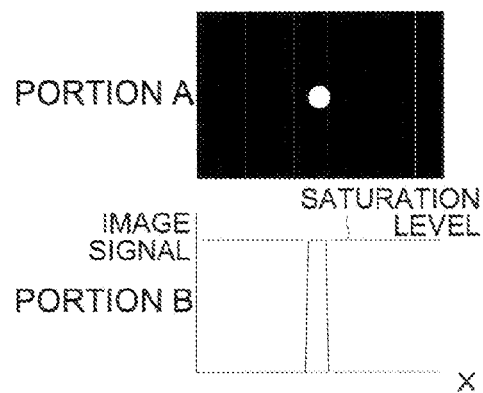
Figure 23D:
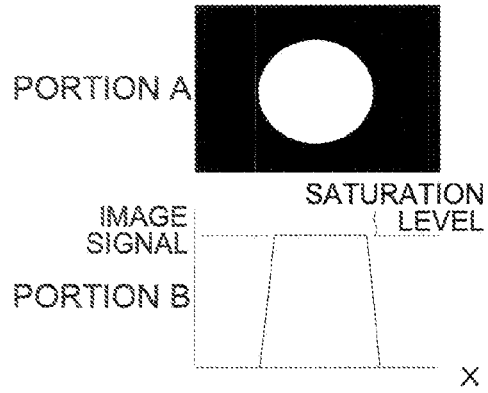

According to the fifth embodiment, as illustrated in FIG. 20, an area selection circuit 80 for selecting a focusing determination area is provided in the DSP 61.

FIG. 21 illustrates a schematic drawing of an area selection circuit 80. The area selection circuit 80 includes: a first port 81 (area setting information input port) for inputting AF search area setting information "a" and saturation detection area setting information "b" to the area selection circuit 80; a second port 82 (saturation detection result input port) for inputting saturation detection result x(b) for each saturation detection area to the area selection circuit 80; and a third port 83 (area selection result output port) for outputting focusing determination area selection result y (=f(x), a, b) from the area selection circuit 80.

The AF search area setting information "a" indicates an AF search area for calculating the AF evaluation value in the image area. The saturation detection area setting information "b" indicates a saturation detection area for determining the presence or absence of a point light source in the image area. The saturation detection result x(b) indicates the presence or absence of a point light source for each saturation detection area. The saturation detection result x(b) is outputted for each AF search step from the saturation detection circuit 66. The area selection result "y" indicates a focusing determination area selected from a plurality of AF search areas.

When the saturation detection area 211 in FIG. 5 and the AF search areas 221 and 222 in FIG. 6 are set, for example, each area size ratio with respect to the image area 200 is inputted to the first port 81 as the area setting information "a" and "b". Note that the saturation detection area 211 in FIG. 5 is the same as the first AF search area 221 in FIG. 6. Therefore, actually, an input of the area setting information of the saturation detection area 211 can be assumed to be the same as the input of the area setting information of the first AF search area 221. Moreover, the presence or absence of a point light source in the saturation detection area 211 is inputted to the second port 82 as the saturation detection result x(b). Then, if there is no point light source in the saturation detection area 211, the area selection circuit 80 outputs an area selection result "y" indicating the first AF search area 221 from the third port 83; and if there is a point light source in the saturation detection area 211, the area selection circuit 80 outputs an area selection result y indicating the second AF search area 222 from the third port 83.

When the saturation detection area 231 in FIG. 11 and the AF search areas 241 and 242 in FIG. 12 are set, for example, the divided area identification numbers 0 to 48 to be set to the image area 200 are inputted to the first port 81 as the area setting information "a" and "b". Note that the saturation detection area 231 in FIG. 11 is the same as the first AF search area 241 in FIG. 12. Therefore, actually, an input of the area setting information of the saturation detection area 231 can be assumed to be the same as the input of the area setting information of the first AF search area 241. Moreover, the presence or absence of a point light source in the saturation detection area 231 is inputted to the second port 82 as the saturation detection result x(b). Then, if there is no point light source in the saturation detection area 231, the area selection circuit 80 outputs an area selection result "y" indicating the first AF search area 241 from the third port 83; and if there is a point light source in the saturation detection area 231, the area selection circuit 80 outputs an area selection result "y" indicating the second AF search area 242 from the third port 83.

When the saturation detection area 251 in FIG. 13 and the AF search areas 261 and 262 in FIG. 14 are set, for example, the number of divided areas (number of rows and number of columns) to be set to the image area 200 as the saturation detection area 251 is inputted to the first port 81 as the setting information "a" and "b". Moreover, the saturation detection result x(b) indicating the presence or absence of a point light source for each saturation detection area 251 is inputted to the second port 82. Then, if there is no point light source in the central area (divided area number 24), the area selection circuit 80 outputs the area selection result "y" indicating the position (row and column) of the central area from the third port 83. If there is a point light source in the central area, the area selection circuit 80 selects a plurality of areas containing at least the closest area to the central area from the areas having no point light source and outputs the area selection result "y" indicating the position (row and column) of the selected area from the third port 83.

When the saturation detection area 271 in FIG. 17 and AF search areas 281 to 284 in FIG. 18 are set, for example, the number of divided areas (number of rows and number of columns) to be set to the image area 200 as the saturation detection area 271 is inputted to the first port 81 as the setting information "a" and "b". The correspondence between a divided area and its priority may be inputted to the first port 81, or a priority may be assigned to each divided area by the logic in the area selection circuit 80. Moreover, the saturation detection result x(b) indicating the presence or absence of a point light source for each saturation detection area 271 is inputted to the second port 82. Then, if there is no point light source in the first AF search area 281 in the center, the area selection circuit 80 outputs the area selection result "y" indi-cating the position (row and column) of the first AF search area 281 from the third port 83. If there is a point light source in the first AF search area 281, the area selection circuit 80 outputs the area selection result "y" indicating the position (row and column) of an area selected based on the priority from an area having no point light source from the third port 83.

The present embodiment enables high-speed area selection by hardware. Note that in comparison with saturation area calculation, the present embodiment needs a simple process and thus does not need to increase the circuit scale very much.

The presently disclosed subject matter can be provided as a computer-readable program code for causing a device (such as an electronic camera or a computer) to execute the above described process, a computer-readable recording medium on which the computer-readable program code is stored or a computer program product including the computer-readable program code.

It should be noted that the presently disclosed subject matter is not limited to the embodiments described in this description and examples illustrated in the accompanying drawings, but it should be apparent that various design modifications and improvements could be made hereto without departing from the spirit and scope of the invention.

What is claimed is:

1. An imaging apparatus comprising:
an imaging optical system including a focus lens;
an imaging element configured to image an object image focused by the imaging optical system and to generate an image indicating the object image;
a lens drive device configured to move the focus lens along an optical axis direction of the imaging optical system;
an evaluation value calculation device configured to set a plurality of evaluation value calculation areas different in size to each other to the image and to calculate an evaluation value of a contrast for each of the plurality of evaluation value calculation areas while moving the focus lens by the lens drive device;
a point light source presence/absence determination device configured to determine a presence or absence of a point light source in a specific region of the image;
an area selection device configured to select a focusing determination area for determining a focusing position of the focus lens from a plurality of the evaluation value calculation areas based on the presence or absence of the point light source; and
a focusing control device configured to determine the focusing position of the focus lens based on the evaluation value in the focusing determination area and to move the focus lens to the focusing position by the lens drive device, wherein
the evaluation value calculation device sets a first evaluation value calculation area and a second evaluation value calculation area larger than the first evaluation value calculation area in the image; and
if the point light source presence/absence determination device determines that there is no point light source, the area selection device selects the first evaluation value calculation area, and if the point light source presence/absence determination device determines that there is a point light source, the area selection device selects the second evaluation value calculation area.

2. The imaging apparatus according to claim 1, wherein
the point light source presence/absence determination device determines the presence or absence of a point light source by comparing a pixel value or an intensity value in the image with a threshold value.

3. An imaging apparatus comprising:
an imaging optical system including a focus lens;
an imaging element configured to image an object image focused by the imaging optical system and to generate an image indicating the object image;
a lens drive device configured to move the focus lens along an optical axis direction of the imaging optical system;
an evaluation value calculation device configured to set a plurality of evaluation value calculation areas different in size to each other to the image and to calculate an evaluation value of a contrast for each of the plurality of evaluation value calculation areas while moving the focus lens by the lens drive device;
a point light source presence/absence determination device configured to determine a presence or absence of a point light source in a specific region of the image;
an area selection device configured to select a focusing determination area for determining a focusing position of the focus lens from a plurality of the evaluation value calculation areas based on the presence or absence of the point light source; and
a focusing control device configured to determine the focusing position of the focus lens based on the evaluation value in the focusing determination area and to move the focus lens to the focusing position by the lens drive device, wherein
the evaluation value calculation device sets a first evaluation value calculation area and a second evaluation value calculation area larger than the first evaluation value calculation area and not overlapped with the first evaluation value calculation area in the image;
the point light source presence/absence determination device determines the presence or absence of a point light source in the first evaluation value calculation area; and
if the point light source presence/absence determination device determines that there is no point light source in the first evaluation value calculation area, the area selection device selects the first evaluation value calculation area, and if the point light source presence/absence determination device determines that there is a point light source in the first evaluation value calculation area, the area selection device selects the second evaluation value calculation area.

4. The imaging apparatus according to claim 3, wherein the point light source presence/absence determination device determines the presence or absence of a point light source by comparing a pixel value or an intensity value in the image with a threshold value.

5. An imaging apparatus comprising:
an imaging optical system including a focus lens
an imaging element configured to image an object image focused by the imaging optical system and to generate an image indicating the object image;
a lens drive device configured to move the focus lens along an optical axis direction of the imaging optical system;
an evaluation value calculation device configured to set a plurality of evaluation value calculation areas different in size to each other to the image and to calculate an evaluation value of a contrast for each of the plurality of evaluation value calculation areas while moving the focus lens by the lens drive device;
a point light source presence/absence determination device configured to determine a presence or absence of a point light source in a specific region of the image;
an area selection device configured to select a focusing determination area for determining a focusing position of the focus lens from a plurality of the evaluation value calculation areas based on the presence or absence of the point light source; and
a focusing control device configured to determine the focusing position of the focus lens based on the evaluation value in the focusing determination area and to move the focus lens to the focusing position by the lens drive device, wherein
the area selection device includes an area selection circuit comprising: a first port for inputting area setting information indicating a range of a point light source presence/absence determination area for determining the presence or absence of the point light source and a range of the evaluation value calculation area for calculating an evaluation value of the contrast; a second port for inputting a point light source presence/absence determination result in the point light source presence/absence determination area; and a third port for outputting a selection result of the focusing determination area,
wherein the area selection circuit outputs a selection result of the focusing determination area based on the area setting information and the point light source presence/absence determination result.

6. The imaging apparatus according to claim 5, wherein
the point light source presence/absence determination device determines the presence or absence of a point light source by comparing a pixel value or an intensity value in the image with a threshold value.

7. An imaging apparatus comprising:
an imaging optical system including a focus lens
an imaging element configured to image an object image focused by the imaging optical system and to generate an image indicating the object image;
a lens drive device configured to move the focus lens along an optical axis direction of the imaging optical system;
an evaluation value calculation device configured to set a plurality of evaluation value calculation areas different in size to each other to the image and to calculate an evaluation value of a contrast for each of the plurality of evaluation value calculation areas while moving the focus lens by the lens drive device;
a point light source presence/absence determination device configured to determine a presence or absence of a point light source in a specific region of the image;
an area selection device configured to select a focusing determination area for determining a focusing position of the focus lens from a plurality of the evaluation value calculation areas based on the presence or absence of the point light source; and
a focusing control device configured to determine the focusing position of the focus lens based on the evaluation value in the focusing determination area and to move the focus lens to the focusing position by the lens drive device, wherein
the point light source presence/absence determination device calculates an average value of pixel values or intensity values between pixels adjacent to each other in the image and determines the presence or absence of a point light source by comparing the average value with a threshold value.

8. The imaging apparatus according to claim 7, wherein
the evaluation value calculation device calculates the evaluation value at a plurality of lens positions while moving the focus lens in an optical axis direction; and
the point light source presence/absence determination device calculates the average value for each of the plurality of lens positions and if a detection is made at the plurality of lens positions that the average value is greater than the threshold, determines that there is a point light source.

9. An imaging control method using an imaging optical system including a focus lens; an imaging element which images an object image focused by the imaging optical system and generates an image indicating the object image; and a lens drive device which moves the focus lens along an optical axis direction of the imaging optical system, the imaging control method comprising:

an evaluation value calculation step of setting a plurality of evaluation value calculation areas to the image and calculating an evaluation value of a contrast of the image for each of the plurality of evaluation value calculation areas while moving the focus lens by the lens drive device;

a point light source presence/absence determination step of determining a presence or absence of a point light source in the image;

an area selection step of selecting a focusing determination area for determining a focusing position of the focus lens from a plurality of the evaluation value calculation areas based on the presence or absence of the point light source; and a focusing control step of determining the focusing position of the focus lens based on the evaluation value in the focusing determination area and moving the focus lens to the focusing position by the lens drive device, wherein, in the evaluation value calculation step, a first evaluation value calculation area and a second evaluation value calculation area larger than the first evaluation value calculation area are set in the image; and if it is determined that there is no point light source in the point light source presence/absence determination step, the first evaluation value calculation area is selected in the area selection step, and if it is determined that there is a point light source in the point light source presence/absence determination step, the second evaluation value calculation area is selected in the area selection step.

10. The imaging control method according to claim 9, wherein the presence or absence of a point light source is determined by comparing a pixel value or an intensity value in the image with a threshold value in the point light source presence/absence determination step.

11. An imaging control method using an imaging optical system including a focus lens; an imaging element which images an object image focused by the imaging optical system and generates an image indicating the object image; and a lens drive device which moves the focus lens along an optical axis direction of the imaging optical system, the imaging control method comprising:

an evaluation value calculation step of setting a plurality of evaluation value calculation areas to the image and calculating an evaluation value of a contrast of the image for each of the plurality of evaluation value calculation areas while moving the focus lens by the lens drive device;

a point light source presence/absence determination step of determining a presence or absence of a point light source in the image;

an area selection step of selecting a focusing determination area for determining a focusing position of the focus lens from a plurality of the evaluation value calculation areas based on the presence or absence of the point light source; and a focusing control step of determining the focusing position of the focus lens based on the evaluation value in the focusing determination area and moving the focus lens to the focusing position by the lens drive device, wherein, in the evaluation value calculation step, a first evaluation value calculation area and a second evaluation value calculation area larger than the first evaluation value calculation area and not overlapped with the first evaluation value calculation area are set in the image;

in the point light source presence/absence determination step, the presence or absence of a point light source in the first evaluation value calculation area is determined; and if it is determined that there is no point light source in the first evaluation value calculation area in the point light source presence/absence determination step, the first evaluation value calculation area is selected in the area selection step, and if it is determined that there is a point light source in the first evaluation value calculation area in the point light source presence/absence determination step, the second evaluation value calculation area is selected in the area selection step.

12. The imaging control method according to claim 11, wherein the presence or absence of a point light source is determined by comparing a pixel value or an intensity value in the image with a threshold value in the point light source presence/absence determination step.

13. An imaging control method using an imaging optical system including a focus lens; an imaging element which images an object image focused by the imaging optical system and generates an image indicating the object image; and a lens drive device which moves the focus lens along an optical axis direction of the imaging optical system, the imaging control method comprising:

an evaluation value calculation step of setting a plurality of evaluation value calculation areas to the image and calculating an evaluation value of a contrast of the image for each of the plurality of evaluation value calculation areas while moving the focus lens by the lens drive device;

a point light source presence/absence determination step of determining a presence or absence of a point light source in the image;

an area selection step of selecting a focusing determination area for determining a focusing position of the focus lens from a plurality of the evaluation value calculation areas based on the presence or absence of the point light source; and a focusing control step of determining the focusing position of the focus lens based on the evaluation value in the focusing determination area and moving the focus lens to the focusing position by the lens drive device, wherein the area selection step includes:

inputting area setting information indicating a range of a point light source presence/absence determination area for determining the presence or absence of the point light source and a range of the evaluation value calculation area for calculating an evaluation value of the contrast;

inputting a point light source presence/absence determination result in the point light source presence/absence determination area;

outputting a selection result of the focusing determination area based on the area setting information and the point light source presence/absence determination result.

14. The imaging control method according to claim 13, wherein
the presence or absence of a point light source is determined by comparing a pixel value or an intensity value in the image with a threshold value in the point light source presence/absence determination step.

15. An imaging control method using an imaging optical system including a focus lens; an imaging element which images an object image focused by the imaging optical system and generates an image indicating the object image; and a lens drive device which moves the focus lens along an optical axis direction of the imaging optical system,
the imaging control method comprising:
an evaluation value calculation step of setting a plurality of evaluation value calculation areas to the image and calculating an evaluation value of a contrast of the image for each of the plurality of evaluation value calculation areas while moving the focus lens by the lens drive device;
a point light source presence/absence determination step of determining a presence or absence of a point light source in the image;
an area selection step of selecting a focusing determination area for determining a focusing position of the focus lens from a plurality of the evaluation value calculation areas based on the presence or absence of the point light source; and
a focusing control step of determining the focusing position of the focus lens based on the evaluation value in the focusing determination area and moving the focus lens to the focusing position by the lens drive device, wherein,
in the point light source presence/absence determination step, an average value of pixel values or intensity values between pixels adjacent to each other in the image is calculated, and the presence or absence of a point light source is determined by comparing the average value with a threshold value.

16. The imaging control method according to claim 15, wherein,
in the evaluation value calculation step, the evaluation value at a plurality of lens positions is calculated while the focus lens is moved in an optical axis direction; and,
in the point light source presence/absence determination step, the average value for each of the plurality of lens positions is calculated, and if a detection is made at the plurality of lens positions that the average value is greater than the threshold, it is determined that there is a point light source.

* * * * *